(12) United States Patent
Iyoda

(10) Patent No.: US 8,468,298 B2
(45) Date of Patent: Jun. 18, 2013

(54) MANAGEMENT DEVICE AND MANAGEMENT METHOD

(75) Inventor: Satoshi Iyoda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 200 days.

(21) Appl. No.: 12/900,744

(22) Filed: Oct. 8, 2010

(65) Prior Publication Data
US 2011/0035546 A1    Feb. 10, 2011

Related U.S. Application Data

(63) Continuation of application No. PCT/JP2008/057134, filed on Apr. 11, 2008.

(51) Int. Cl.
G06F 12/00    (2006.01)

(52) U.S. Cl.
USPC ............ 711/112; 711/4; 711/5; 711/100; 711/111; 711/114; 711/154; 711/156; 711/161; 711/162; 360/69; 360/73.03; 713/322; 713/323; 713/324

(58) Field of Classification Search
USPC ............ 711/5, 111, 112, 114, E12.001, 154, 711/156, 161–162; 713/322–324; 360/69, 360/73.03
See application file for complete search history.

(56) References Cited

U.S. PATENT DOCUMENTS

| | | |
|---|---|---|
| 6,289,399 B1 | 9/2001 | Furuichi et al. |
| 6,583,947 B1 * | 6/2003 | Hakamata et al. ............ 360/69 |

(Continued)

FOREIGN PATENT DOCUMENTS

| | | |
|---|---|---|
| JP | 11-073255 | 3/1999 |
| JP | 2000-293314 | 10/2000 |
| JP | 2003-173240 | 6/2003 |
| JP | 2007-133821 | 5/2007 |
| JP | 2007-164376 | 6/2007 |
| JP | 2007-323354 | 12/2007 |

OTHER PUBLICATIONS

Notice of Reason for Rejection (with English translation) mailed Feb. 28, 2012 from corresponding Japanese Patent Application No. 2010-507097.
International Search Report mailed Jul. 8, 2008, and issued in Int'l. App. No. PCT/JP2008/057134.
Translation of the IPRP, Issued in International App. No. PCT/JP2008/057134, mailed Dec. 9, 2010.
Notice of Reason for Rejection (with English translation) mailed Nov. 13, 2012 in corresponding Japanese Patent Application No. 2010-507097.

Primary Examiner — Tuan Thai
Assistant Examiner — Zhuo Li
(74) Attorney, Agent, or Firm — Greer, Burns & Crain, Ltd.

(57) ABSTRACT

Timing at which a rotation of a physical disk can stop is taken to more appropriately stop the rotation of the physical disk. A management device for managing a storage device and a server includes a first recording part in which an identification number of a logic volume and a rotational state of the physical disk are recorded, a second recording part in which an operating state of the server and an identification number of the logic volume to be accessed by the server are recorded, an updating part for changing the operating state of the server recorded in the second recording part when the operating state of the server is changed, an extracting part for extracting an operating state of another server to access another logic volume of the physical disk having the logic volume to be accessed by the server set from the second recording part based on the identification number of the logic volume to be accessed by the server recorded on the first recording part, and an instructing part for giving an instruction to the storage device for changing the rotation state of the physical disk depending on the operating state after the server is changed and the operating state of the other server.

18 Claims, 30 Drawing Sheets

U.S. PATENT DOCUMENTS

| | | | |
|---|---|---|---|
| 7,680,981 B2 * | 3/2010 | Yamamoto et al. | 711/112 |
| 7,856,526 B2 * | 12/2010 | Shibayama et al. | 711/112 |
| 8,250,390 B2 * | 8/2012 | Takada et al. | 713/320 |
| 2003/0193732 A1 | 10/2003 | Hakamata et al. | |
| 2003/0193733 A1 | 10/2003 | Hakamata et al. | |
| 2005/0259345 A1 | 11/2005 | Hakamata et al. | |
| 2006/0193073 A1 | 8/2006 | Hakamata et al. | |
| 2007/0113005 A1 | 5/2007 | Yamamoto et al. | |
| 2009/0231750 A1 | 9/2009 | Hakamata et al. | |
| 2010/0138601 A1 | 6/2010 | Yamamoto et al. | |

* cited by examiner

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-STOP STATUS | VM-A | IN-STOP STATUS | VOLUME#A |
| 2 | | | | VM-B | IN-STOP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-STOP STATUS | | – | VOLUME#E |

| | LUN | ACCESS SERVER NUMBER | STORAGE NAME | DISK ROTATING STATUS |
|---|---|---|---|---|
| 1 | VOLUME#A | WWN#1 | DISK-A | IN-STOP STATUS |
| 2 | VOLUME#B | WWN#1 | DISK-A | IN-STOP STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-OPERATION STATUS | VM-A | STARTUP INITIATION STATUS | VOLUME#A |
| 2 | | | | VM-B | IN-STOP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-STOP STATUS | | - | VOLUME#E |

| | LUN | ACCESS SERVER NUMBER | STORAGE NAME | DISK ROTATING STATUS |
|---|---|---|---|---|
| 1 | VOLUME#A | WWN#1 | DISK-A | ROTATION START STATUS |
| 2 | VOLUME#B | WWN#1 | DISK-A | ROTATION START STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |

| | LUN | ACCESS SERVER NUMBER | STORAGE NAME | DISK ROTATING STATUS |
|---|---|---|---|---|
| 1 | VOLUME#A | WWN#1 | DISK-A | ACCESSIBLE STATUS |
| 2 | VOLUME#B | WWN#1 | DISK-A | ACCESSIBLE STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |

FIG. 10

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-OPERATION STATUS | VM-A | IN-STARTUP STATUS | VOLUME#A |
| 2 | | | | VM-B | IN-STOP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-STOP STATUS | | - | VOLUME#E |

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-OPERATION STATUS | VM-A | IN-STARTUP STATUS | VOLUME#A |
| 2 | HOST SERVER 2A | WWN#1 | IN-OPERATION STATUS | VM-B | IN-STARTUP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-STOP STATUS | | - | VOLUME#E |

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-OPERATION STATUS | VM-A | IN-STARTUP STATUS | VOLUME#A |
| 2 | | | | VM-B | IN-STOP STATUS | VOLUME#B |
| 3 | HOST SERVER2B | WWN#2 | IN-STOP STATUS | VM-C | IN-STOP STATUS | VOLUME#C |
| 4 | HOST SERVER2C | WWN#3 | IN-STOP STATUS | VM-D | IN-STOP STATUS | VOLUME#D |
| 5 | BACKUP SERVER 3 | WWN#4 | IN-STOP STATUS | | – | VOLUME#E |

FIG. 16

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-STOP STATUS | VM-A | IN-STOP STATUS | VOLUME#A |
| 2 | | | | VM-B | IN-STOP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-STOP STATUS | | — | VOLUME#E |

| | LUN | ACCESS SERVER NUMBER | STORAGE NAME | DISK ROTATING STATUS |
|---|---|---|---|---|
| 1 | VOLUME#A | WWN#1 | DISK-A | IN-STOP STATUS |
| 2 | VOLUME#B | WWN#1 | DISK-A | IN-STOP STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-STOP STATUS | VM-A | IN-STOP STATUS | VOLUME#A |
| 2 | | | | VM-B | IN-STOP STATUS | VOLUME#B |
| 3 | HOST SERVER 2B | WWN#2 | IN-STOP STATUS | VM-C | IN-STOP STATUS | VOLUME#C |
| 4 | HOST SERVER 2C | WWN#3 | IN-STOP STATUS | VM-D | IN-STOP STATUS | VOLUME#D |
| 5 | BACKUP SERVER 3 | WWN#4 | IN-OPERATION STATUS | | — | VOLUME#E |

| | LUN | ACCESS SERVER NUMBER | STORAGE NAME | DISK ROTATING STATUS |
|---|---|---|---|---|
| 1 | VOLUME#A | WWN#1 | DISK-A | IN-STOP STATUS |
| 2 | VOLUME#B | WWN#1 | DISK-A | IN-STOP STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | ACCESSIBLE STATUS |

FIG. 22

| | LUN | ACCESS SERVER NUMBER | STORAGE NAME | DISK ROTATING STATUS |
|---|---|---|---|---|
| 1 | VOLUME#A | WWN#1 | DISK-A | IN-STOP STATUS |
| 2 | VOLUME#B | WWN#1 | DISK-A | IN-STOP STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |

| | LUN | ACCESS SERVER NUMBER | STORAGE NAME | DISK ROTATING STATUS |
|---|---|---|---|---|
| 1 | VOLUME#A | WWN#1 | DISK-A | IN-STOP STATUS |
| 2 | VOLUME#B | WWN#1 | DISK-A | IN-STOP STATUS |
| 3 | VOLUME#C | WWN#2 | DISK-B | IN-STOP STATUS |
| 4 | VOLUME#D | WWN#3 | DISK-B | IN-STOP STATUS |
| 5 | VOLUME#E | WWN#4 | DISK-C | IN-STOP STATUS |
| 6 | VOLUME#F | WWN#3 | DISK-D | IN-STOP STATUS |
| 7 | VOLUME#G | WWN#3 | DISK-D | IN-STOP STATUS |

FIG. 30

| | SERVER NAME | WWN | SERVER OPERATING STATUS | GUEST OS NAME | GUEST OS STARTUP STATUS | LUN |
|---|---|---|---|---|---|---|
| 1 | HOST SERVER 2A | WWN#1 | IN-STOP STATUS | VM-A | IN-STOP STATUS | VOLUME#A |
| 2 | | | | VM-B | IN-STOP STATUS | VOLUME#B |
| 3 | | | | VM-E | IN-STOP STATUS | VOLUME#F |
| 4 | HOST SERVER 2B | WWN#2 | IN-STOP STATUS | VM-C | IN-STOP STATUS | VOLUME#C |
| 5 | HOST SERVER 2B | WWN#3 | IN-STOP STATUS | VM-D | IN-STOP STATUS | VOLUME#D |
| 6 | | | | VM-F | IN-STOP STATUS | VOLUME#G |
| 7 | BACKUP SERVER 3 | WWN#4 | IN-STOP STATUS | – | | VOLUME#E |

MANAGEMENT DEVICE AND MANAGEMENT METHOD

CROSS-REFERENCE TO RELATED APPLICATION

This is a continuation of Application PCT/JP2008/057134, filed on Apr. 11, 2008, now pending, the contents of which are herein wholly incorporated by reference.

FIELD

The embodiment relates to a management system which manages a storage device and a server.

The storage device has hitherto included a so-called power save mode function of saving the electricity of the storage device by stopping rotations of a physical disk (which is simply termed a disk) undergoing none of accesses for recording and reading data.

In the case of stopping the rotations of the physical disk, it takes normally 30 sec. through several min. till the physical disk resumes its rotations and reaches an accessible status. Therefore, the physical disk stops rotating in the way of being limited to a period of time for which the physical disk receives no access.

In a system having a storage device and a server which are connected via a LAN (Local Area Network), an operating condition of the server can not be grasped from the side of the storage device. Accordingly, a user of the storage device stops rotating the physical disk at a designated point of time in a way that takes the operating condition of the server into consideration.

[Patent Document 1]
Japanese Laid-open Patent Publication No. 11-73255

SUMMARY

Such a case might arise that a relation between the physical disk within the storage device and the server accessing the physical disk becomes complicated. Hence, it is difficult, as the case may be, to determine the physical disk capable of stopping its rotations in terms of the operating condition of the server. For example, if a plurality of servers shares one single physical disk with each other, it is difficult to determine whether the rotations of the physical disk can be stopped or not.

According to an aspect of the embodiment, a management device to manage a storage device having physical disks in which logical volumes are set and a servers of which an access target is the logical volume, the management device includes: a first recording unit to record an identification number of the logical volume and a rotating status of the physical disk; a second recording unit to record an operating status of the servers and the identification number of the logical volume as the access target of the servers; an updating unit to change, if the operating status of one server is changed, the operating status of the one server recorded in the second recording unit; an extracting unit to extract, based on the identification number of one logical volume as the access target of the one server that is recorded in the first recording unit, an operating status of another server of which an access target is another logical volume of the physical disk in which the one logical volume as the access target of the one server is set from the second recording unit; and an instructing unit to instruct the storage device to change a rotating status of the physical disk, corresponding to a post-changing operating status of the server and the operating status of another server.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a storage table 80.

FIG. 7 is a diagram of the server VM table 70 in a status where data in a "SERVER OPERATING STATUS" field and data in a "GUEST OS STARTUP STATUS" field are updated.

FIG. 9 is a diagram of the storage table 80 in the status where the data in the "DISK ROTATING STATUS" field is updated.

FIG. 10 is a diagram of the server VM table 70 in a status where the data in the "GUEST OS STARTUP STATUS" field is updated.

FIG. 12 is a diagram of the server VM table 70 in a status where the data in the "GUEST OS STARTUP STATUS" field is updated.

FIG. 14 is a diagram of the server VM table 70 in the status where the data in the "GUEST OS STARTUP STATUS" field is updated.

FIG. 16 is a diagram of the server VM table 70 in a status where the data in the "SERVER OPERATING STATUS" field and the data in the "guest OS startup status" field are updated.

FIG. 19 is a diagram of the server VM table 70 in a status where the data in the "SERVER OPERATING STATUS" field is updated.

FIG. 21 is a diagram of the storage table 80 in a status where the data in the "DISK ROTATING STATUS" field is updated.

FIG. 22 is a diagram of the storage table 80 in a status where the data in the "DISK ROTATING STATUS" field is updated.

FIG. 25 is a diagram of the post-updating storage table 80.

FIG. 30 is a diagram of the post-updating server VM table 70.

DESCRIPTION OF EMBODIMENT

A management device according to the embodiment will hereinafter be described with reference to the drawings.

The management device according to the embodiment extracts, from the second recording unit, the operating status of another server of which the access target is another logical volume of the physical disk in which the logical volume as the access target of the server is set. The management device according to the embodiment grasps a timing of changing the rotating status of the physical disk by grasping the post-changing operating status of the server and the operating status of another server.

Namely, the management device according to the embodiment determines whether the rotating status of the physical disk can be changed or not. The management device according to the embodiment may instruct the storage device to change the rotating status of the physical disk at the more proper timing.

According to the embodiment, the rotation-stop-enabled timing of the physical disk within the storage device is grasped, whereby the rotations of the physical disk within the storage device can be stopped more adequately.

Figure 1:
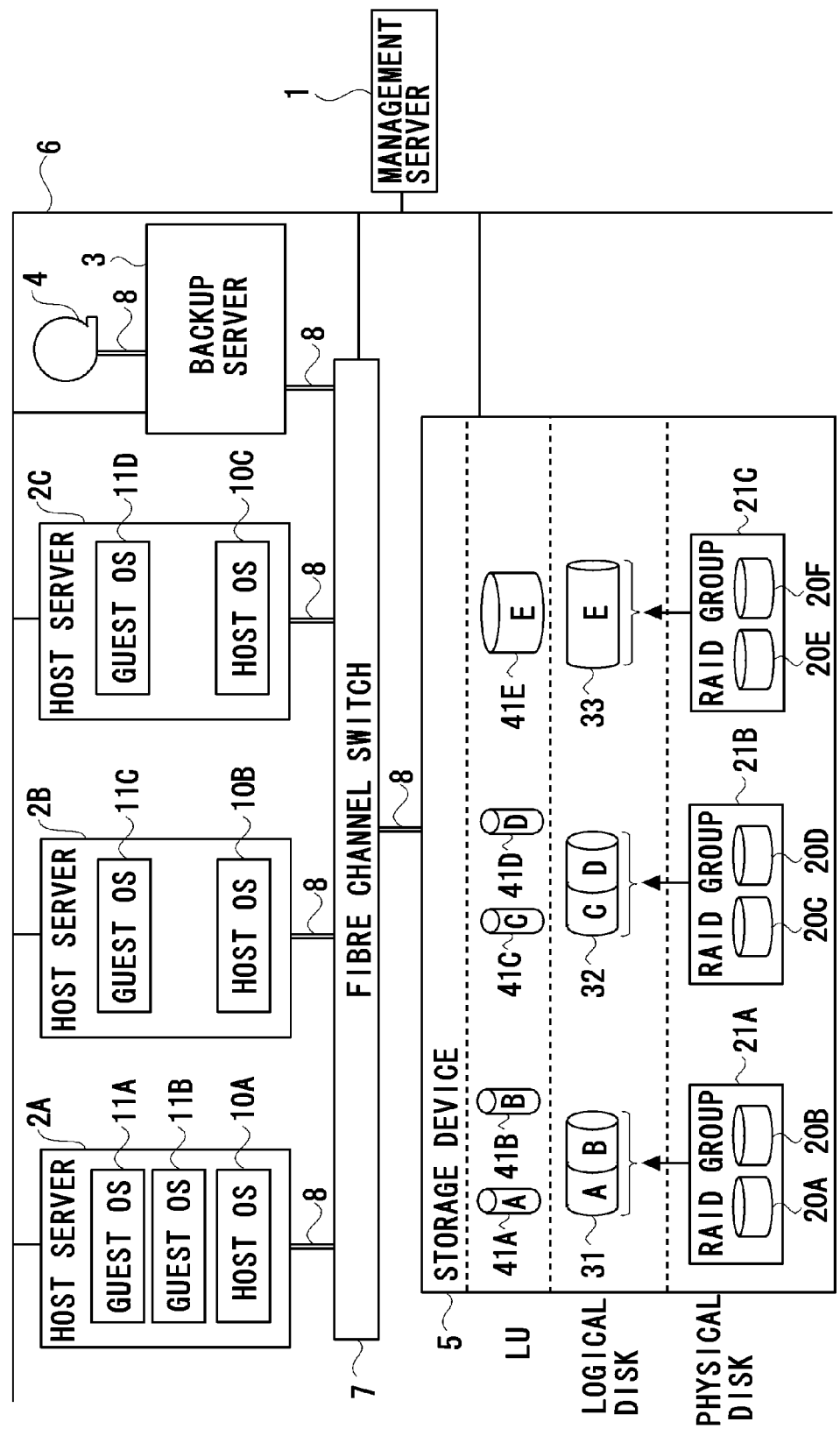
FIG. 1 is a diagram of a whole system according to the embodiment.

FIG. 1 is a view of a whole system according to the embodiment. As illustrated in FIG. 1, the system includes a management server 1 defined as the management device, host servers 2A-2C, a backup server 3, a tape device 4 and a storage device 5.

The management server 1, the host servers 2A-2C, the backup server 3 and the storage device 5 are connected to each other via a communication network 6 such as a Local Area Network (LAN). The host servers 2A-2C, the backup server 3 and the storage device 5 are registered as management target devices in the management server 1.

A fiber channel switch 7 is provided between the host servers 2A-2C/backup server 3 and the storage device 5. The host servers 2A-2C, the backup server 3 and the fibre channel switch 7 are mutually connected via fibre channels 8 such as optical fibres. Further, the storage device 5 and the fibre channel switch 7 are connected to each other via the fibre channel 8. Still further, the backup server 3 and the tape device 4 are connected to each other via the fibre channel 8.

In the system, a SAN (Storage Area Network) is configured by connecting the host servers 2A-2C, the backup server 3 and the storage device 5 to each other via the fibre channel switch 7.

The host servers 2A-2C and the backup server 3 are, e.g., personal computers, workstations, mainframes, etc. Each of the host servers 2A-2C and the backup server 3 includes a CPU (Central Processing Unit), a memory such as a RAM (Random Access Memory) and a ROM (Read Only Memory), an interface, an input/output device, etc. Each of the host servers 2A-2C has a virtual machine (VM) program.

The host server 2A includes a host OS (Operating System) 10A and guest OSs 11A and 11B. The host OS 10A and the guest OSs 11A and 11B are applications that run on the host server 2A. In the host server 2A, the virtual machine program is executed, whereby the guest OS 11A and the guest OS 11B are started up and run on the host OS 10A.

The host server 2B includes a host OS 10B and a guest OS 11C. The host OS 10B and the guest OS 11C are the applications that run on the host server 2B. In the host server 2B, the virtual machine program is executed, whereby the guest OS 11C is started up and runs on the host OS 10B.

The host server 2C includes a host OS 10C and a guest OS 11D. The host OS 10C and the guest OS 11D are the applications that run on the host server 2C. In the host server 2C, the virtual machine program is executed, whereby the guest OS 11D is started up and runs on the host OS 10C.

Each of the host OSs 10A-10C is the operating system (OS) which operates the virtual machine program, and each of the guest OSs 11A-11D is the OS running on a virtual machine. Further, the host servers 2A-2C and the backup server 3 are equipped with host bus adaptors (HBAs) as adaptors needed for establishing connections to the SAN. Moreover, the host servers 2A-2C and the backup server 3 include device drivers, application programs, etc.

The storage device 5 is equipped with physical disks 20A-20F. The storage device 5 is provided with a RAID (Redundant Arrays of Inexpensive (or Independent) Disks) group 21A which organizes the physical disks 20A and 20B as one aggregation. Further, the storage device 5 is provided with a RAID group 21B which organizes the physical disks 20C and 20D as one aggregation. Still further, the storage device 5 is provided with a RAID group 21C which organizes the physical disks 20E and 20F as one aggregation.

The storage device 5 is equipped with logical disks 31, 32, 33. One logical disk 31 is configured by linking the physical disks 20A and 20B together. One logical disk 32 is configured by linking the physical disks 20C and 20D together. One logical disk 33 is configured by linking the physical disks 20E and 20F together.

The storage device 5 is equipped with Logical Units (LUs) 41A-41E. The LUs 41A and 41B are a plurality of storage areas into which the logical disk 31 is segmented. The LUs 41C and 41D are a plurality of storage areas into which the logical disk 32 is segmented. The LU 41E is one storage area into which the logical disk 33 is formed. Thus, the LUs 41A and 41B are set on the physical disks 20A and 20B, the LUs 41C and 41D are set on the physical disks 20C and 20D, and the LU 41E is set on the physical disks 20E and 20F. Further, the LUs 41A-41E are called logical volumes.

Herein, when describing a relation between the LU 41A and the RAID group 21A, the LU 41A is said to belong to the RAID group 21A. When describing a relation between the LU 41B and the RAID group 21A, the LU 41B is said to belong to the RAID group 21A. Further, when describing a relation between the LU 41C and the RAID group 21B, the LU 41C is said to belong to the RAID group 21B. When describing a relation between the LU 41D and the RAID group 21B, the LU 41D is said to belong to the RAID group 21B. Still further, when describing a relation between the LU 41E and the RAID group 21C, the LU 41E is said to belong to the RAID group 21C.

The storage device 5 is equipped with an external interface via which to transmit and receive data to and from the management server 1, the host servers 2A-2C and the backup server 3. Moreover, the storage device 5 includes a so-called power save mode function of switching on/off a power save mode by starting or stopping rotations of the physical disks 20A-20F.

The host servers 2A-2C and the backup server 3 access the LUs 41A-41E on a per-unit basis of the respective LUs 41A-41E. Namely, the host servers 2A-2C and the backup server 3 determine one or more of the LUs 41A-41E as an access target(s) and execute predetermined operations by making use of one or more of the LUs 41A-41E.

When the guest OS 11A runs on the host OS 10A, the host OS 10A allocates one or more of the LUs 41A-41E to the guest OS 11A. Accordingly, when the host OS 10A allocates one or more of the LUs 41A-41E to the guest OS 11A, the guest OS 11A sets one or more of the LUs 41A-41E as the access target(s). The same operation of the guest OS 11 is applied to the guest OSs 11A-11D.

The fibre channel switch 7 includes a name server function, a routing function, etc. The fibre channel switch 7 undergoes setting for associating the respective devices connected to the fibre channel switch 7. In FIG. 1, the single storage device 5 is connected to the fibre channel switch 7, however, which does not mean that the number of the storage device(s) 5 is limited to "1". A plurality of storage devices 5 may be connected to the fibre channel switch 7. Further, the management server 1 may acquire the configuration of the SAN by accessing the fibre channel switch 7.

Figure 2:
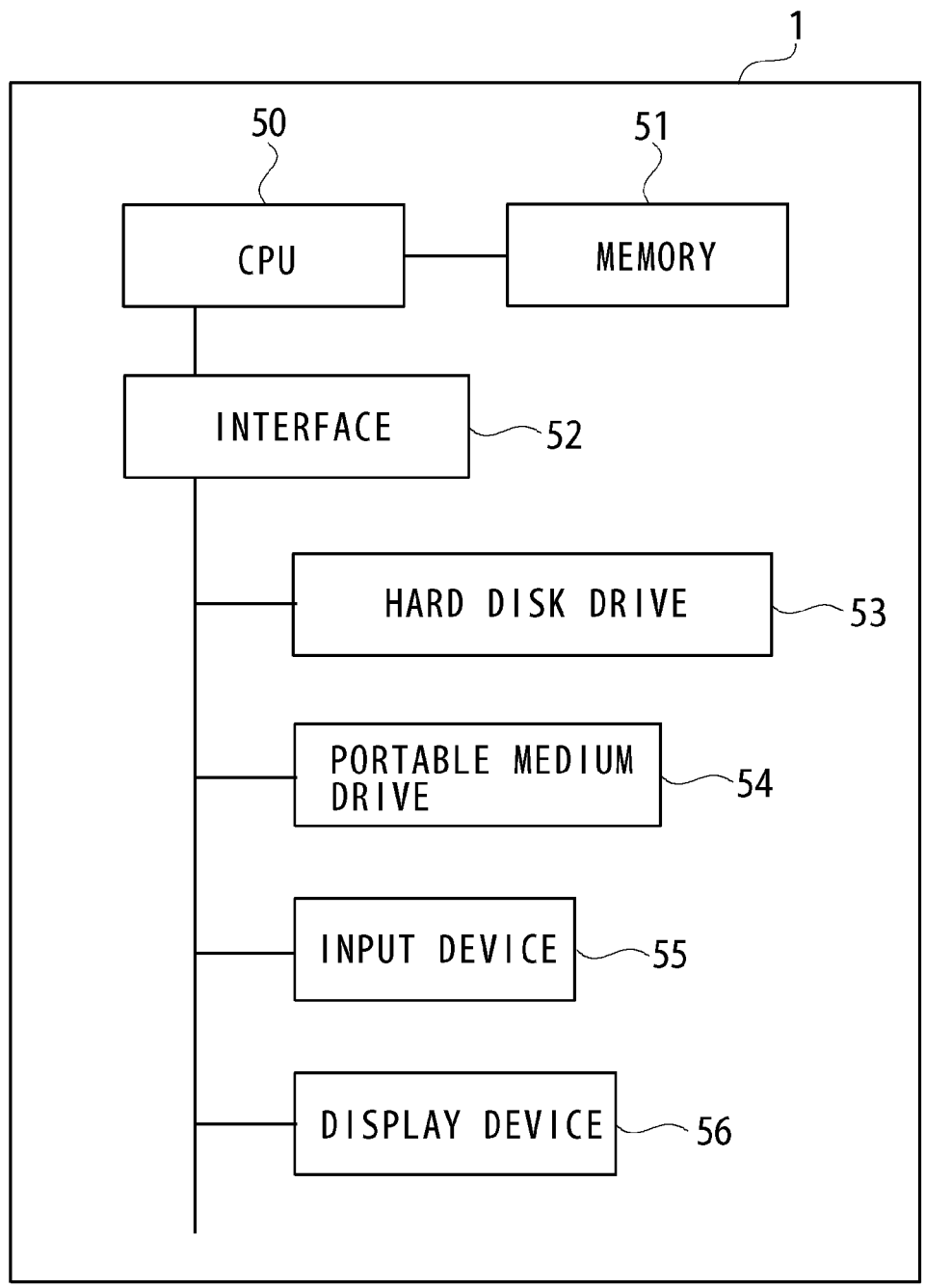
FIG. 2 is a diagram illustrating a hardware configuration of a management server 1.

The management server 1 is exemplified by the personal computer, the workstation, the mainframe, etc. FIG. 2 illustrates a hardware configuration of the management server 1. As depicted in FIG. 2, the management server 1 includes a CPU 50 which executes a computer program and thus controls the management server 1, and a memory 51 stored with the computer program executed by the CPU 50 and data processed by the CPU 50. Further, as depicted in FIG. 2, the management server 1 includes an interface 52 for connecting the CPU 50 to a variety of devices, a hard disk drive 53, a portable medium drive 54, an input device 55 and a display device 56.

The memory 51 is, e.g., a volatile RAM or a nonvolatile ROM. The interface 52 may be any one of a serial interface such as Universal Serial Bus (USB) and a parallel interface such as Peripheral Component Interconnect (PCI). Note that the CPU 50 is connected via the interface 52 to the respective devices, however, the connections between the CPU 50 and the respective devices may be established by a different interface. Moreover, a plurality of interfaces may be bridge-connected.

The hard disk drive 53 is stored with the program which is loaded into the memory 51. Further, the hard disk drive 53 is stored with the data processed by the CPU 50. The portable medium drive 54 is a drive for a Compact Disc (CD), a Digital Versatile Disk (DVD), an HD-DVD (High Definition DVD), Blu-disc, etc. Moreover, the portable medium drive 54 may also be an Input/Output (I/O) device of a card medium having the nonvolatile memory such as a flash memory. The medium driven by the portable medium drive 54 is stored with, e.g., the computer program installed into the hard disk drive 53 and with the input data. The input device 55 is exemplified such as a keyboard, a mouse, a pointing device and a wireless remote controller.

The display device 56 displays the data processed by the CPU 50 and the data stored in the memory 51. The display device 56 is exemplified such as a liquid crystal display device, a plasma display panel, a Cathode Ray Tube (CRT) and an electroluminescence panel.

Figure 3:
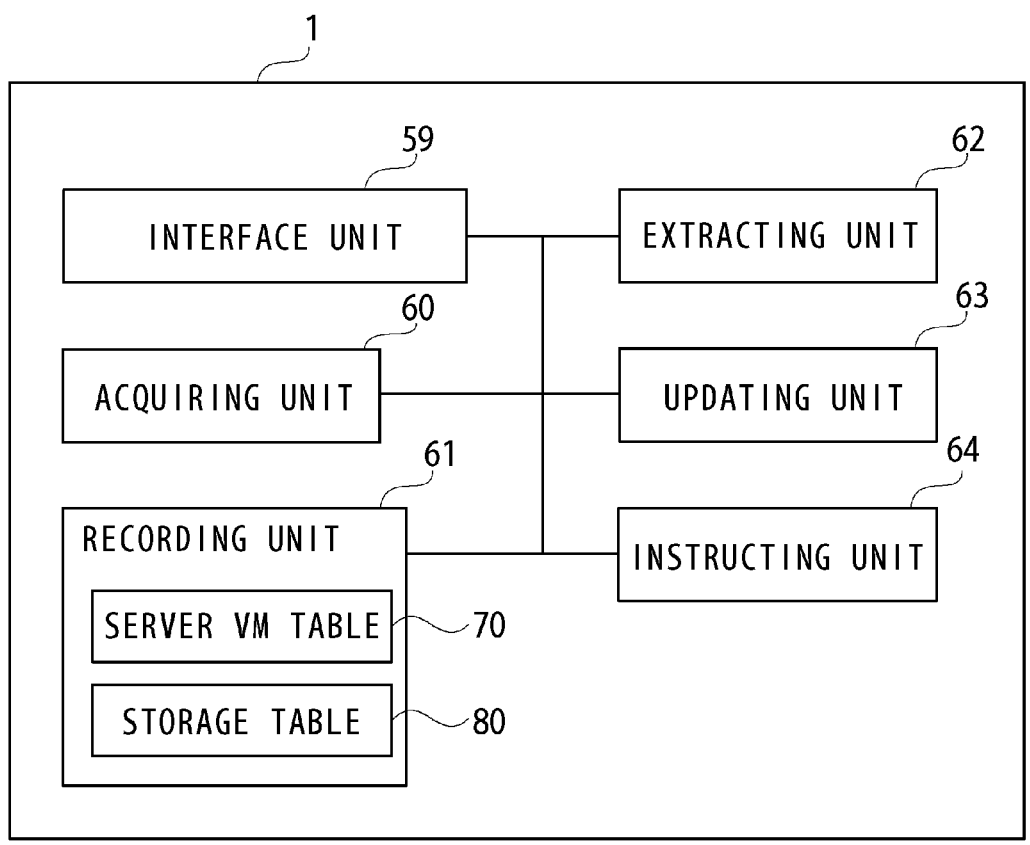
FIG. 3 is a function block diagram of the management server 1.

FIG. 3 illustrates a function block diagram of the management server 1. The management server 1 includes an interface unit 59, an acquiring unit 60, a recording unit 61, an extracting unit 62, an updating unit 63 and an instructing unit 64. These function units may be realized by the computer including the CPU 50, the memory 51, etc and the respective devices and by programs executed on the computer.

The interface unit 59 accepts the accesses to the host servers 2A-2C and the backup server 3 and notifications given from the host servers 2A-2C and the backup server 3.

The acquiring unit 60 acquires the data about the host servers 2A-2C, the backup server 3 and the storage device 5 via the interface unit 59.

The recording unit 61 is recorded with data about management target devices of the management server 1. For example, names of the host servers 2A-2C, the backup server 3 and the storage device 5 are recorded as the data related to the management target devices of the management server 1. The recording unit 61 has a server VM table 70 (the recording unit 61 is an example of a second recording unit) and a storage table 80 (the storage table 80 is an example of a first recording unit). The server VM table 70 is recorded with the data about the host servers 2A-2C and the backup server 3. The storage table 80 is recorded with the data about the storage device 5.

The extracting unit 62 extracts the date recorded in the recording unit 61. The extracting unit 62 extracts the items of data related to the host servers 2A-2C and the backup server 3, which are recorded in the server VM table 70. The extracting unit 62 extracts the data about the storage device 5, which is recorded in the storage table 80.

The updating unit 63 updates the data recorded in the recording unit 61. The updating unit 63 updates the items of data about the host servers 2A-2C and the backup server 3, which are recorded in the server VM table 70. The updating unit 63 updates the data related to the storage device 5, which is recorded in the storage table 80.

The instructing unit 64 gives predetermined instructions to the host servers 2A-2C, the backup server 3 and the storage device 5 via the interface unit 59.

Given next an explanation of a process in which the management server 1 acquires the various items of data from the host servers 2A-2C, the backup server 3 and the storage device 5 via the LAN. To be specific, the acquiring unit 60 acquires the various items of data from the host servers 2A-2C, the backup server 3 and the storage device 5.

Herein, the host server 2A sets the LU 41A and the LU 41B as the access target areas. Then, the host server 2B sets the LU 41C as the access target area. Further, the host server 2C sets the LU 41D as the access target area. Moreover, the backup server 3 sets the LU 41E as the access target area.

Further, an assumption in the host servers 2A-2C is that the virtual machines are started up. Then, the host OS 10A allocates the LU 41A to the guest OS 11A and the LU 41B to the guest OS 11B. Furthermore, the host OS 10B allocates the LU 41C to the guest OS 11C. Moreover, the host OS 10C allocates the LU 41D to the guest OS 11D.

Figure 4:
FIG. 4 is a diagram illustrating a server VM table 70.

The various items of data acquired from the host servers 2A-2C, the backup server 3 and the storage device 5 are recorded in the server VM table 70 and the storage table 80. FIG. 4 is a diagram illustrating the server VM table 70, and FIG. 5 is a diagram illustrating the storage table 80.

The acquiring unit 60 acquires the respective items of data such as a server name, a World Wide Name (WWN), a server operating status, a guest OS name, a guest OS startup status and a Logical Unit Number (LUN) from the host servers 2A-2C via the interface unit 59. Further, the acquiring unit 60 acquires the respective items of data such as the server name, the WWN, the server operating status and the LUN from the backup server 3 via the interface unit 59.

The acquiring unit 60 may also acquire the respective items of data by periodically accessing the host servers 2A-2C and the backup server 3 via the interface unit 59. Further, the host servers 2A-2C and the backup server 3 may transmit the respective items of data to the management server 1 periodically or when satisfying a predetermined condition. The respective items of data transmitted to the management server 1 are acquired by the acquiring unit 60 via the interface unit 59.

The server name is a name of each of the host servers 2A-2C and the backup server 3. The names of the host servers 2A-2C and the backup server 3 are recorded in the "SERVER NAME" field of the server VM table 70 illustrated in FIG. 4.

The WWN is a unique identification name allocated to each of the host servers 2A-2C and the backup server 3 which build up the SAN. Names such as WWN#1, WWN#2, WWN#3 and WWN#4 are recorded in the "WWN" field of the server VM table 70 illustrated in FIG. 4. The names WWN#1, WWN#2, WWN#3 and WWN#4 are the unique identification names allocated to the host servers 2A-2C and the backup server 3, respectively.

The server operating status is a present operating status of each of the host servers 2A-2C and the backup server 3. The server operating status is exemplified by an in-operation status or an in-stop status. If any one of the guest OS 11A and the guest OS 11B begins being started up or is in the process of being started up, the server operating status of the host server 2A is the in-operation status. Further, if both of the guest OS 11A and the guest OS 11B are kept stopping, the server operating status of the host server 2A is the in-stop status.

If the guest OS 11C is started up, the server operating status of the host server 2B is the in-operation status. If the guest OS 11C is not started up, the server operating status of the host server 2B is the in-stop status. If the guest OS 11D is started up, the server operating status of the host server 2C is the in-operation status. If the guest OS 11C is not started up, the server operating status of the host server 2C is the in-stop status.

The guest OS name is a name of each of the guest OSs 11A-11D. [VM-A] is recorded as a name of the guest OS 11A in the "GUEST OS NAME" field in a line number "1" of the server VM table 70 illustrated in FIG. 4. [VM-B] is recorded as a name of the guest OS 11B in the "GUEST OS NAME" field in a line number "2" of the server VM table 70 illustrated in FIG. 4. [VM-C] is recorded as a name of the guest OS 11C in the "GUEST OS NAME" field in a line number "3" of the server VM table 70 illustrated in FIG. 4. [VM-D] is recorded as a name of the guest OS 11D in the "GUEST OS NAME" field in a line number "4" of the server VM table 70 illustrated in FIG. 4.

The guest OS startup status is the present startup status of each of the guest OSs 11A-11D. The guest OS startup status is classified into a startup initiation status, an in-startup status or an in-stop status.

The LUN is a number for identifying each of the LUs 41A-41E held by the storage device 5. [VOLUME#A], [VOLUME#B], [VOLUME#C], [VOLUME#D] and [VOLUME#E] are recorded in a "LUN" field of the server VM table 70 illustrated in FIG. 4.

In FIG. 4, for the explanation's sake, the notation is given such as [VOLUME#A], [VOLUME#B], [VOLUME#C], [VOLUME#D] and [VOLUME#E], however, as a matter of fact, coded 3-bit identifiers are recorded in the "LUN" field of the server VM table 70.

[VOLUME#A] specifies the LUN of the LU 41A allocated to the guest OS 11A. As illustrated in FIG. 4, [VOLUME#A] is recorded in the "LUN" field in the line number "1" of the server VM table 70.

[VOLUME#B] specifies the LUN of the LU 41B allocated to the guest OS 11B. As illustrated in FIG. 4, [VOLUME#B] is recorded in the "LUN" field in the line number "2" of the server VM table 70.

[VOLUME#C] specifies the LUN of the LU 41C allocated to the guest OS 11C. As illustrated in FIG. 4, [VOLUME#C] is recorded in the "LUN" field in the line number "3" of the server VM table 70.

[VOLUME#D] specifies the LUN of the LU 41D allocated to the guest OS 11D. As illustrated in FIG. 4, [VOLUME#D] is recorded in the "LUN" field in the line number "4" of the server VM table 70.

[VOLUME#E] specifies the LUN of the LU 41E defined as the access target area of the backup server 3. As illustrated in FIG. 4, [VOLUME#E] is recorded in the "LUN" field in the line number "5" of the server VM table 70.

Thus, in the server VM table 70 illustrated in FIG. 4, one group is organized by the items of data such as the server name, the WWN, the server operating status, the guest OS name, the guest OS startup status and the LUN. Within this group, the items of data such as the server name, the WWN, the server operating status, the guest OS name, the guest OS startup status and the LUN are associated with each other. For example, in the line number "1" of the server VM table 70 illustrated in FIG. 4, one group is organized by [HOST SERVER 2A], [WWN#1], [IN-STOP STATUS], [VM-A], [IN-STOP STATUS] and [VOLUME#A]. The structure is the same with other line numbers of the server VM table 70 illustrated in FIG. 4.

The acquiring unit 60 acquires the respective items of data such as the LUN, an access server number, a storage name, and a disk rotating status from the storage device 5. The LUN of the LU 41 defined as the access target area of the host servers 2A-2C and the backup server 3 is recorded in the "LUN" field of the storage table 80 depicted in FIG. 5.

The access server number is a number for identifying each of the host servers 2A-2C and the backup server 3 of which the access target area are the LUs 41. The access number involves using the WWN allocated to each of the host servers 2A-2C and the backup server 3.

WWN#1 is the unique identification name allocated to the host server 2A. The access target areas of the host server 2A are the LU 41A and the LU 41B. Accordingly, the WWN#1 is recorded in the "ACCESS SERVER NUMBER" field in the line numbers 1 and 2 of the storage table 80 illustrated in FIG. 5.

WWN#2 is the unique identification name allocated to the host server 2B. The access target area of the host server 2B is the LU 41C. Accordingly, WWN#2 is recorded in the "ACCESS SERVER NUMBER" field in the line number 3 of the storage table 80 illustrated in FIG. 5.

WWN#3 is the unique identification name allocated to the host server 2C. The access target area of the host server 2C is the LU 41D. Therefore, WWN#3 is recorded in the "ACCESS SERVER NUMBER" field in the line number 4 of the storage table 80 illustrated in FIG. 5.

WWN#4 is the unique identification name allocated to the backup server 3. The access target area of the backup server 3 is the LU 41E. Accordingly, WWN#4 is recorded in the "ACCESS SERVER NUMBER" field in the line number 5 of the storage table 80 illustrated in FIG. 5.

The storage name is a name of each of the RAID groups 21A-21C set in the storage device 5.

The RAID group 21A is a group which organizes the physical disks 20A and 20B undergoing the setting of the LU 41A (VOLUME#A) and the LU 41B (VOLUME#B) as one aggregation. [DISK-A] is recorded as a name of the RAID group 21A in the "STRAGE NAME" field in the line numbers 1 and 2 of the storage table 80 illustrated in FIG. 5.

The RAID group 21B is a group which organizes the physical disks 20C and 20D undergoing the setting of the LU 41C (VOLUME#C) and the LU 41D (VOLUME#D) as one aggregation. [DISK-B] is recorded as a name of the RAID group 21B in the "STRAGE NAME" field specified by the line numbers 3 and 4 of the storage table 80 illustrated in FIG. 5.

The RAID group 21C is a group which organizes the physical disks 20E and 20F undergoing the setting of the LU 41E (VOLUME#E) as one aggregation. [DISK-C] is recorded as a name of the RAID group 21C in the "STRAGE NAME" field in the line number 5 of the storage table 80 illustrated in FIG. 5.

The disk rotating status is the present rotating status of each of the physical disks 20A-20F. The rotating statuses of the physical disks 20A and 20B of the RAID group 21A are recorded in the "DISK ROTATING STATUS" field in the line numbers 1 and 2 of the storage table 80 illustrated in FIG. 5. The rotating statuses of the physical disks 20C and 20D of the RAID group 21B are recorded in the "DISK ROTATING STATUS" field in the line numbers 3 and 4 of the storage table 80 illustrated in FIG. 5. The rotating statuses of the physical disks 20E and 20F of the RAID group 21C are recorded in the "DISK ROTATING STATUS" field in the line number 5 of the storage table 80 illustrated in FIG. 5.

In the storage table 80 illustrated in FIG. 5, one group is organized by items of data such as the LUN, the access server number, the storage name and the disk rotating status. In this group, the items of data such as the LUN, the access server number, the storage name and the disk rotating status are associated with each other. For example, one group is organized by [VOLUME#A], [WWN#1], [DISK-A] and [in-stop status] in the line number 1 of the storage table 80 illustrated in FIG. 5. The structure is the same with other lines of the storage table 80 illustrated in FIG. 5.

<Description of Process of Management Server 1 in Startup of Guest OS 11A>

Figure 6:
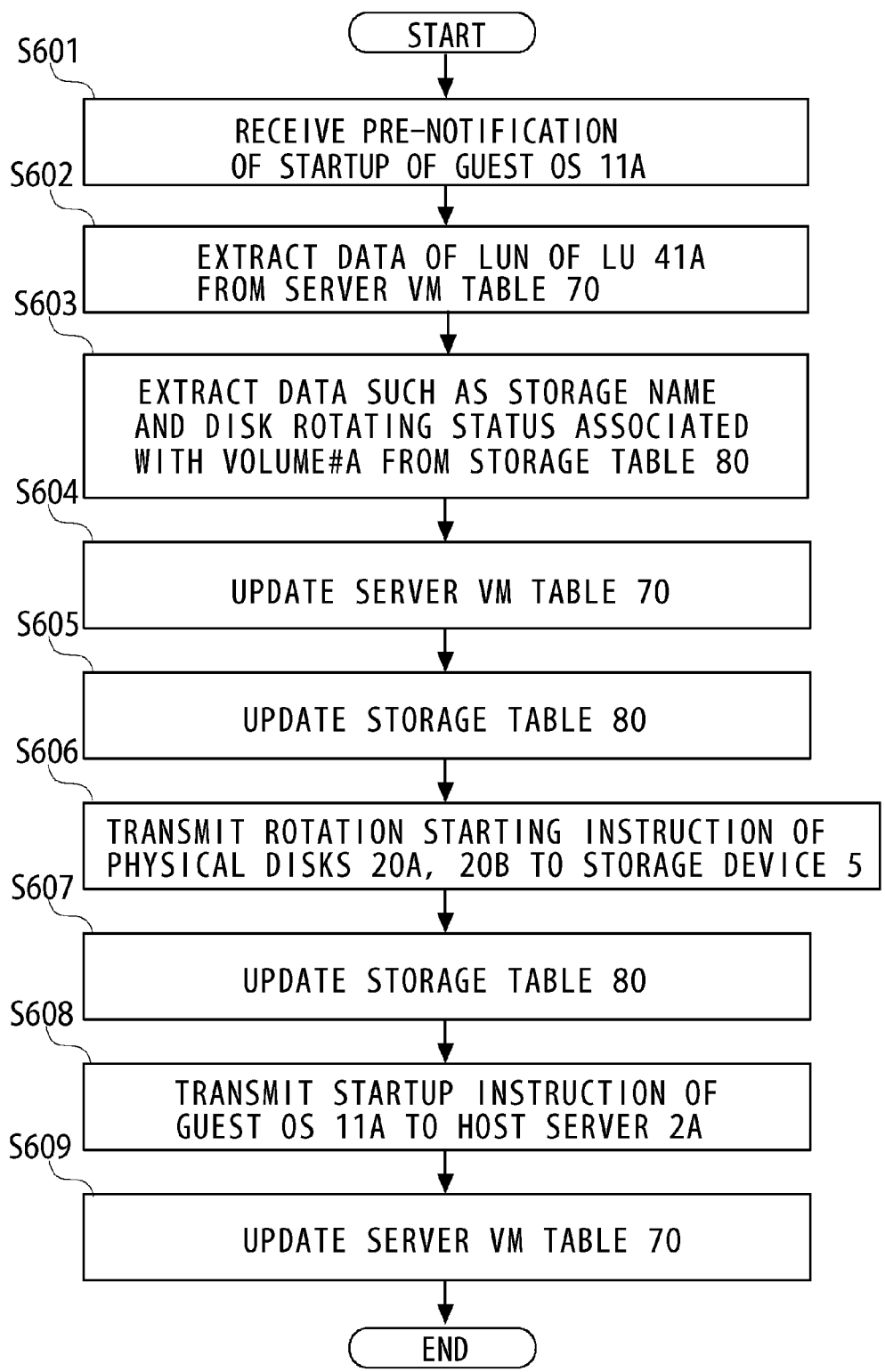
FIG. 6 is a flowchart illustrating a processing flow of the management server 1 in the case of starting up a guest OS 11A.

A process of the management server 1 in the case of starting up the guest OS 11A will be described with reference to FIG. 6. FIG. 6 is a flowchart illustrating a processing flow of the management server 1 in the case of starting up the guest OS 11A. Herein, the guest OSs 11A-11D are the in-stop status. Further, the backup server 3 is in the in-stop status. Accordingly, the contents of the server VM table 70 held by the management server 1 are those illustrated in FIG. 4. Moreover, the contents of the storage table 80 held by the management server 1 are those illustrated in FIG. 5.

To begin with, the interface unit 59 receives a pre-notification of the startup of the guest OS 11A from the host OS 10A (S601). When the interface unit 59 receives the pre-notification of the startup of the guest OS 11A from the host OS 10A, the extracting unit 62 extracts the data of the LUN of the LU 41A allocated to the guest OS 11A from the server VM table 70 (S602). Herein, the data [VOLUME#A] defined as the LUN of the LU 41 allocated to the guest OS 11A is extracted from the server VM table 70 illustrated in FIG. 4.

Next, the extracting unit 62 extracts, from the storage table 80, the respective items of data such as the storage name and the disk rotating status associated with the data [VOLUME#A] extracted in the process of S602 (S603). Namely, the extracting unit 62 extracts, based on the data [VOLUME#A] extracted in the process of S602, the data related to the RAID group 21A including the physical disks 20A and 20B, in which the LU 41 is set, from the storage table 80. Herein, the data [DISK-A] is extracted as the data of the storage name from the storage table 80 illustrated in FIG. 5. Further, the data [IN-STOP STATUS] is extracted as the data of the disk rotating status from the storage table 80 depicted in FIG. 5.

Next, the updating unit 63 updates the data in the "SERVER OPERATING STATUS" field and the data in the "GUEST OS STARTUP STATUS" field of the server VM table 70 (S604). FIG. 7 is a diagram of the server VM table 70 in a status where the data in the "SERVER OPERATING STATUS" field and the data in the "GUEST OS STARTUP STATUS" field are updated. The data is updated from the [IN-STOP STATUS] to the [IN-OPERATION STATUS] in the "SERVER OPERATING STATUS" field in the line numbers 1 and 2 of the server VM table 70 illustrated in FIG. 7. Further, the data is updated from the [IN-STOP STATUS] to the [STARTUP INITIATION STATUS] in the "GUEST OS STARTUP STATUS" field in the line number 1 of the server VM table 70 illustrated in FIG. 7.

Figure 8:
FIG. 8 is a diagram of the storage table 80 in a status where data in a "DISK ROTATING STATUS" field is updated.

Then, the updating unit 63 updates the data in the "DISK ROTATING STATUS" field of the storage table 80 (S605). FIG. 8 is a diagram of the storage table 80 in a status where the data in the "DISK ROTATING STATUS" field is updated. The data is updated from the [IN-STOP STATUS] to a [ROTATION STARTING STATUS] in the "DISK ROTATING STATUS" field in the line numbers 1 and 2 of the storage table 80 illustrated in FIG. 8.

Next, the instructing unit 64 sends an instruction of starting the rotations of the physical disks 20A and 20B to the storage device 5 via the interface unit 59 (S606).

Herein, the storage device 5 receiving the rotation starting instruction of the physical disks 20A and 20B starts rotating the physical disks 20A and 20B. Then, when the rotations of the physical disks 20A and 20B reach an accessible status, the storage device 5 sends to the management server 1 a notification saying that the physical disks 20A and 20B become accessible.

In the case of receiving the notification saying that the physical disks 20A and 20B become accessible, the updating unit 63 updates the data in the "DISK ROTATING STATUS" field of the storage table 80 (S607). FIG. 9 is a diagram of the storage table 80 in a status where the "DISK ROTATING STATUS" field is updated. The data is updated from the [ROTATION STARTING STATUS] to an [ACCESSIBLE STATUS] in the "DISK ROTATING STATUS" field in the line numbers 1 and 2 of the storage table 80 illustrated in FIG. 9.

Next, the instructing unit 64 sends an instruction of starting up the guest OS 11A via the interface unit 59 to the host server 2A (S608).

Then, the updating unit 63 updates the data in the "GUEST OS STARTUP STATUS" field of the server VM table 70 (S609). FIG. 10 is a diagram of the server VM table 70 in a status where the data in the "GUEST OS STARTUP STATUS" field is updated. The data is updated from the [STARTUP INITIATION STATUS] to an [IN-STARTUP STATUS] in the "GUEST OS STARTUP STATUS" field in the line number 1 of the server VM table 70 illustrated in FIG. 10.

The host server 2A receiving the startup instruction of the guest OS 11A starts up the guest OS 11A. After the process in S609, the process of the management server 1 in the startup of the guest OS 11A is finished.

<Description of Process of Management Server 1 in Startup of Guest OS 11B>

Figure 11:
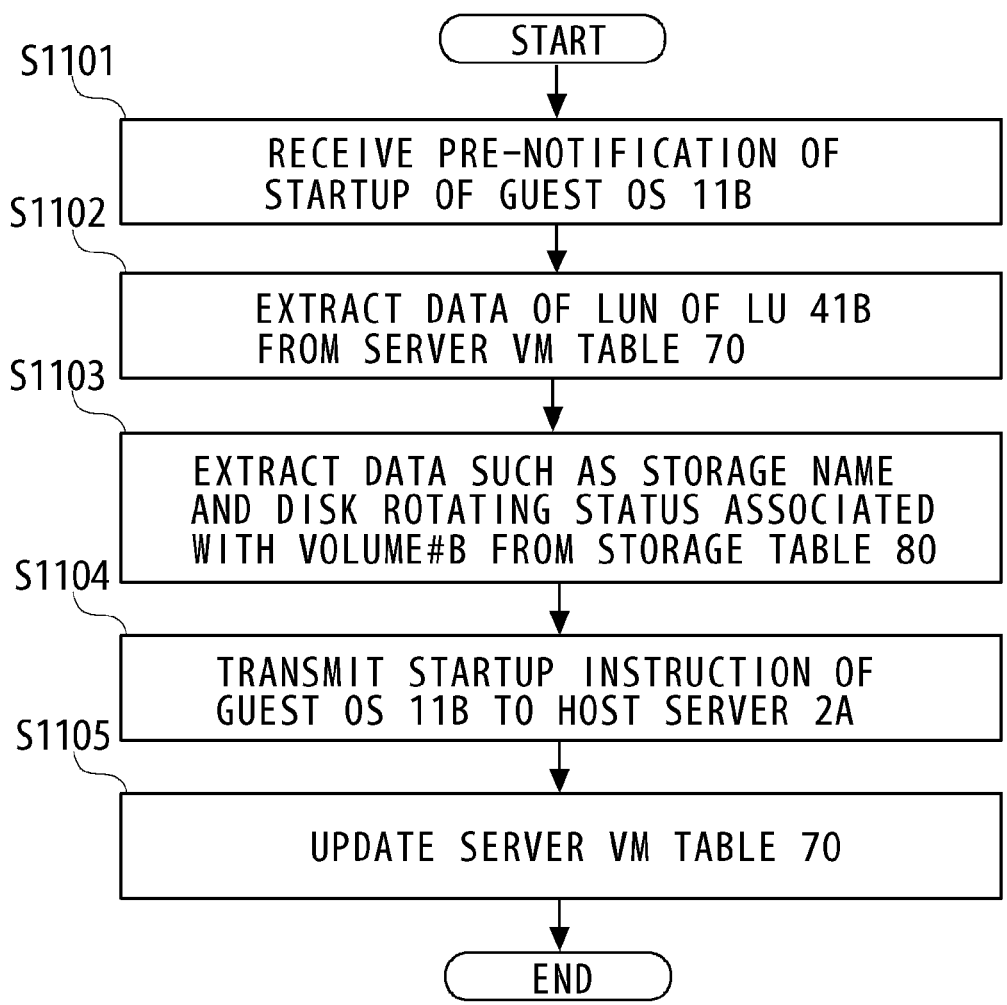
FIG. 11 is a flowchart illustrating a processing flow of a process of the management server 1 in the case of starting up a guest OS 11B.

A process of the management server 1 in the case of starting up the guest OS 11B will be described with reference to FIG. 11. FIG. 11 is a flowchart illustrating a processing flow of the management server 1 in the case of starting up the guest OS 11B. Herein, the guest OS 11A is in the in-startup status, while the guest OS 11B-11D are in the in-stop status. Further, the backup server 3 is in the in-stop status. Accordingly, the contents of the server VM table 70 held by the management server 1 are those illustrated in FIG. 10. Moreover, the contents of the storage table 80 held by the management server 1 are those illustrated in FIG. 9.

At first, the interface unit 59 receives the pre-notification of the startup of the guest OS 11B from the host OS 10A (S1101). When the interface unit 59 receives the pre-notification of the startup of the guest OS 11B from the host OS 10A, the extracting unit 62 extracts the data of the LUN of the LU 41B allocated to the guest OS 11B from the server VM table 70 (S1102). Herein, the data [VOLUME#B] defined as the LUN of the LU 41B allocated to the guest OS 11B is extracted from the server VM table 70 illustrated in FIG. 10.

Next, the extracting unit 62 extracts, from the storage table 80, the respective items of data such as the storage name and the disk rotating status associated with the data [VOLUME#B] extracted in the process of S1102 (S1103). Namely, the extracting unit 62 extracts, based on the data [VOLUME#B] extracted in the process of S1102, the data related to the RAID group 21A including the physical disks 20A and 20B, in which the LU 41B is set, from the storage table 80. Herein, the data [DISK-A] is extracted as the data of the storage name from the storage table 80 illustrated in FIG. 9. Further, the data [ACCESSIBLE STATUS] is extracted as the data of the disk rotating status from the storage table 80 depicted in FIG. 9.

Next, the instructing unit 64 sends an instruction of starting up the guest OS 11B to the host server 2A via the interface unit 59 (S1104). The physical disks 20A and 20B undergoing the setting of the LU 41B allocated to the guest OS 11B are in the accessible status. Therefore, the startup instruction of the guest OS 11B is transmitted to the host server 2A.

Then, the updating unit 63 updates the data in the "GUEST OS STARTUP STATUS" field of the server VM table 70 (S1105). FIG. 12 is a diagram of the server VM table 70 in a status where the data in the "GUEST OS STARTUP STATUS" field is updated. The data is updated from the [IN-STOP STATUS] to the [IN-STARTUP STATUS] in the "GUEST OS STARTUP STATUS" field in the line number 2 of the server VM table 70 illustrated in FIG. 12.

The host server 2A receiving the startup instruction of the guest OS 11B starts up the guest OS 11B. After the process in S1105, the process of the management server 1 in the startup of the guest OS 11B is finished.

<Description of Process of Management Server 1 in Stop of Guest OS 11B>

Figure 13:
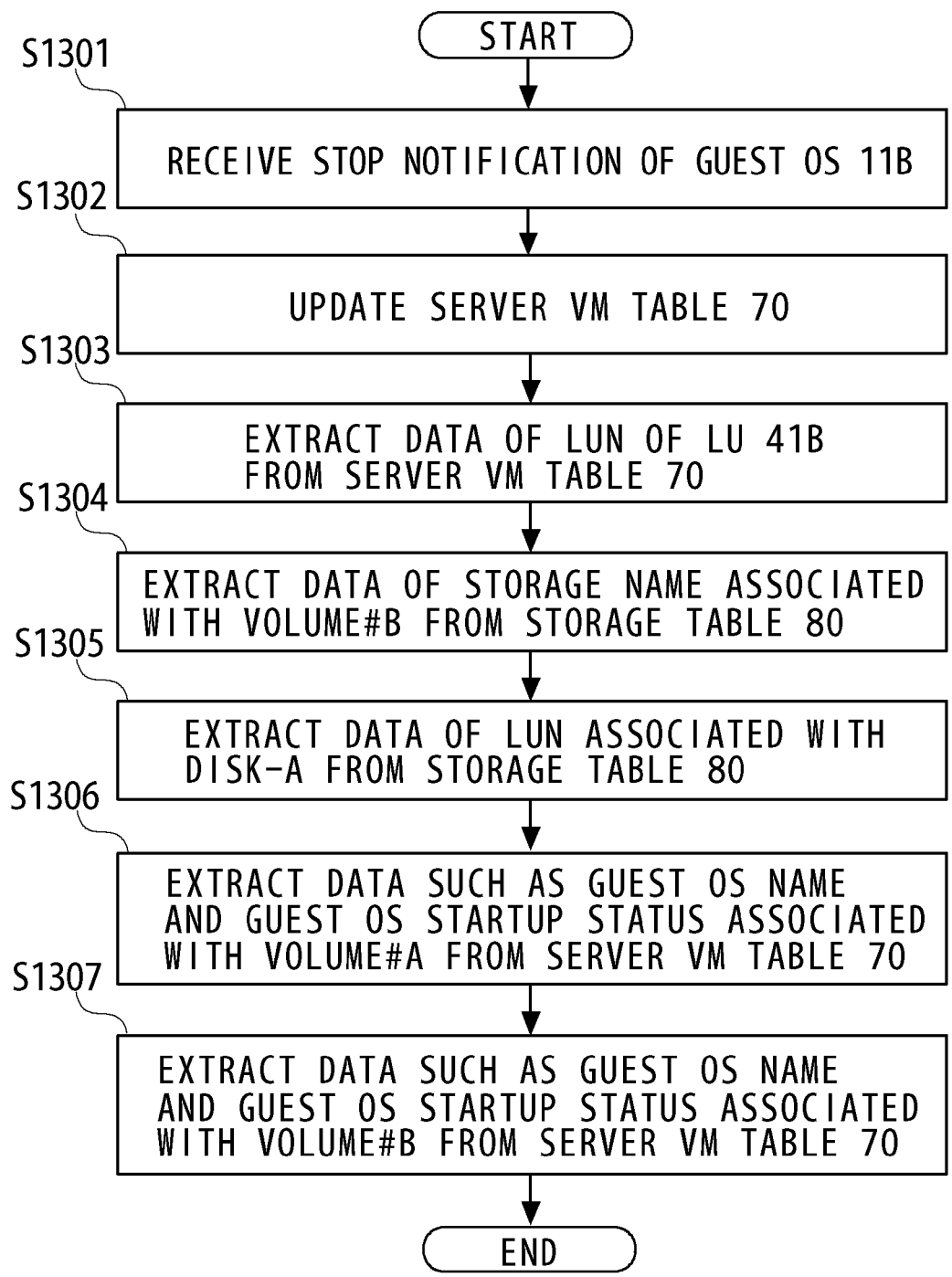
FIG. 13 is a flowchart illustrating a processing flow of a process of the management server 1 in the case of stopping the guest OS 11B.

A process of the management server 1 in the case of stopping the guest OS 11B will be described with reference to FIG. 13. FIG. 13 is a flowchart illustrating a processing flow of the management server 1 in the case of stopping the guest OS 11B. Herein, the guest OSs 11A and 11B are in the in-startup status, while the guest OSs 11C and 11D are in the in-stop status. Further, the backup server 3 is in the in-stop status. Accordingly, the contents of the server VM table 70 held by the management server 1 are those illustrated in FIG. 12. Moreover, the contents of the storage table 80 held by the management server 1 are those illustrated in FIG. 9.

To start with, the interface unit 59 receives a stop notification of the guest OS 11B from the host OS 10A (S1301). The interface unit 59 receives the stop notification of the guest OS 11B from the host OS 10A, in which case the updating unit 63 updates the data in the "GUEST OS STARTUP STATUS" field of the server VM table 70 (S1302). FIG. 14 is a diagram of the server VM table 70 in a status where the data in the "GUEST OS STARTUP STATUS" field is updated. The data is updated to the [IN-STOP STATUS] from the [IN-STARTUP STATUS] in the "GUEST OS STARTUP STATUS" field in the line number 2 of the server VM table 70 illustrated in FIG. 14.

Then, the extracting unit 62 extracts the data of the LUN of the LU 41B allocated to the guest OS 11B from the server VM table 70 (S1303). Herein, the data [VOLUME#B] defined as the LUN of the LU 41B allocated to the guest OS 11B is extracted from the server VM table 70 illustrated in FIG. 14.

Next, the extracting unit 62 extracts, from the storage table 80, the data of the storage name associated with the data [VOLUME#B] extracted in the process of S1303 (S1304). Namely, the extracting unit 62 extracts, based on the data [VOLUME#B] extracted in the process of S1303, the data related to the RAID group 21A including the physical disks 20A and 20B, in which the LU 41B is set, from the storage table 80. Herein, the data [DISK-A] is extracted as the data of the storage name from the storage table 80 illustrated in FIG. 9.

Then, the extracting unit 62 extracts the data of the LUN associated with the data [DISK-A] extracted in the process of S1304 from the storage table 80 (S1305). Herein, the data [VOLUME#A] and the data [VOLUME#B] are extracted from the storage table 80 depicted in FIG. 9.

Next, the extracting unit 62 extracts, from the server VM table 70 illustrated in FIG. 14, the respective items of data such as the guest OS name and the guest startup status associated with the data [VOLUME#A] (S1306). In this case, the extracting unit 62 extracts the data [VM-A] and the data [IN-STARTUP STATUS] from the server VM table 70 illustrated in FIG. 14. The data [VM-A] extracted from the server VM table 70 illustrated in FIG. 14 is a name of the guest OS 11A to which the LU 41A (VOLUME#A) is allocated. Further, the data [IN-STARTUP STATUS] extracted from the server VM table 70 illustrated in FIG. 14 is a startup status of the guest OS 11A to which the LU 41A (VOLUME#A) is allocated.

Then, the extracting unit 62 extracts, from the server VM table 70 illustrated in FIG. 14, the respective items of data such as the guest OS name and the guest startup status associated with the data [VOLUME#B] (S1307). In this case, the extracting unit 62 extracts the data [VM-B] and the data [IN-STOP STATUS] from the server VM table 70 illustrated in FIG. 14. The data [VM-B] extracted from the server VM table 70 illustrated in FIG. 14 is a name of the guest OS 11B to which the LU 41B (VOLUME#B) is allocated. Further, the data [IN-STOP STATUS] extracted from the server VM table 70 illustrated in FIG. 14 is a startup status of the guest OS 11B to which the LU 41B (VOLUME#B) is allocated.

After the process in S1307, the process of the management server 1 in the stop of the guest OS 11B is terminated. The startup status of the guest OS 11A to which the LU 41A (VOLUME#A) is allocated is the [IN-STARTUP STATUS], and the physical disks 20A and 20B are required to continue rotating. Accordingly, the management server 1 does not instruct the storage device 5 to stop the rotations of the physical disks 20A and 20B.

<Description of Process of Management Server 1 in Stop of Guest OS 11A>

Figure 15:
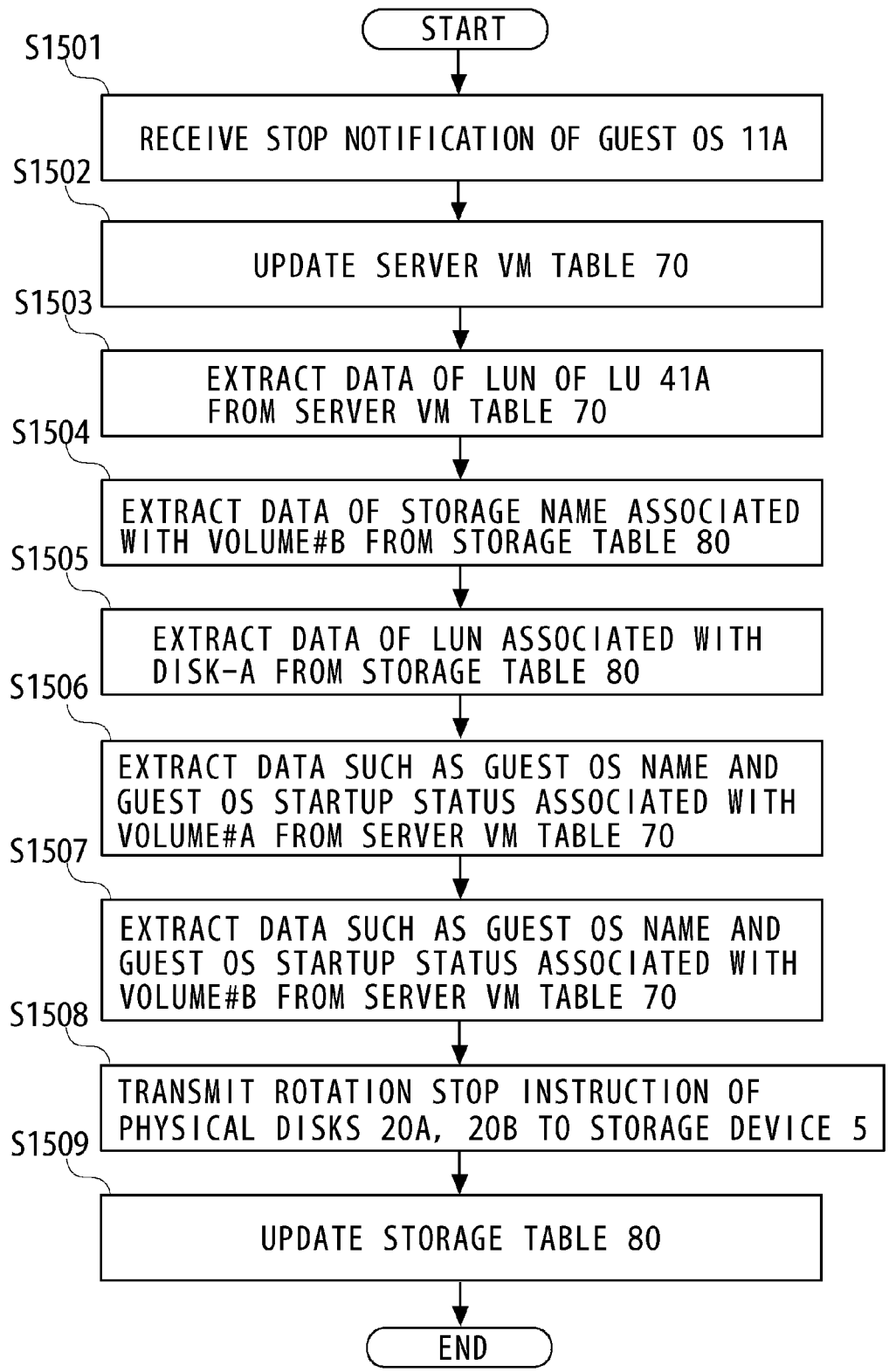
FIG. 15 is a flowchart illustrating a processing flow of the process of the management server 1 in the case of starting up the guest OS 11B.

A process of the management server 1 in the case of stopping the guest OS 11A will be described with reference to FIG. 15. FIG. 15 is a flowchart illustrating a processing flow of the management server 1 in the case of starting up the guest OS 11B. Herein, the guest OS 11A is in the in-startup status, while the guest OSs 11B, 11C and 11D are in the in-stop status. Further, the backup server 3 is in the in-stop status. Accordingly, the contents of the server VM table 70 held by the management server 1 are those illustrated in FIG. 14. Moreover, the contents of the storage table 80 held by the management server 1 are those illustrated in FIG. 9.

To begin with, the interface unit 59 receives a stop notification of the guest OS 11A from the host OS 10A (S1501). The interface unit 59 receives the stop notification of the guest OS 11A from the host OS 10A, in which case the updating unit 63 updates data in the "SERVER OPERATING STATUS" field and data in the "GUEST OS STARTUP STATUS" field of the server VM table 70 (S1502). FIG. 16 is a diagram of the server VM table 70 in a status where the data in the "SERVER OPERATING STATUS" field and the data in the "GUEST OS STARTUP STATUS" field are updated. The data is updated to the [IN-STOP STATUS] from the [IN-OPERATION STATUS] in the "SERVER OPERATING STATUS" field in the line numbers 1 and 2 of the server VM table 70 illustrated in FIG. 16. The data is updated to the [IN-STOP STATUS] from the [IN-STARTUP STATUS] in the "GUEST OS STARTUP STATUS" field in the line number 1 of the server VM table 70 illustrated in FIG. 16.

Then, the extracting unit 62 extracts the data of the LUN of the LU 41A allocated to the guest OS 11A from the server VM table 70 (S1503). Herein, data [VOLUME#A] defined as the LUN of the LU 41A allocated to the guest OS 11A is extracted from the server VM table 70 illustrated in FIG. 16.

Next, the extracting unit 62 extracts, from the storage table 80, the data of the storage name associated with the data [VOLUME#A] extracted in the process of S1503 (S1504). Namely, the extracting unit 62 extracts, based on the data [VOLUME#A] extracted in the process of S1503, the data related to the RAID group 21A including the physical disks 20A and 20B, in which the LU 41A is set, from the storage table 80. Herein, the data [DISK-A] is extracted as the data of the storage name from the storage table 80 illustrated in FIG. 9.

Then, the extracting unit 62 extracts the data of the LUN associated with the data [DISK-A] extracted in the process of S1504 from the storage table 80 (S1505). Herein, the data [VOLUME#A] and the data [VOLUME#B] are extracted from the storage table 80 depicted in FIG. 9.

Next, the extracting unit 62 extracts, from the server VM table 70 illustrated in FIG. 16, the respective items of data such as the guest OS name and the guest startup status associated with the data [VOLUME#A] (S1506). In this case, the extracting unit 62 extracts the data [VM-A] and the data [IN-STOP STATUS] from the server VM table 70 illustrated in FIG. 16. The data [VM-A] extracted from the server VM table 70 illustrated in FIG. 16 is a name of the guest OS 11A to which the LU 41A (VOLUME#A) is allocated. Further, the data [IN-STOP STATUS] extracted from the server VM table 70 illustrated in FIG. 16 is a startup status of the guest OS 11A to which the LU 41A (VOLUME#A) is allocated.

Then, the extracting unit 62 extracts, from the server VM table 70 illustrated in FIG. 16, the respective items of data such as the guest OS name and the guest startup status associated with the data [VOLUME#B] (S1507). In this case, the extracting unit 62 extracts the data [VM-B] and the data [IN-STOP STATUS] from the server VM table 70 illustrated in FIG. 16. The data [VM-B] extracted from the server VM table 70 illustrated in FIG. 16 is a name of the guest OS 11B to which the LU 41B (VOLUME#B) is allocated. Further, the data [IN-STOP STATUS] extracted from the server VM table 70 illustrated in FIG. 16 is a startup status of the guest OS 11B to which the LU 41B (VOLUME#B) is allocated.

Next, the instructing unit 64 transmits the rotation stop instruction of the physical disks 20A and 20B to the storage device 5 via the interface unit 59 (S1508). The LU 41A (VOLUME#A) allocated to the guest OS 11A belongs to the RAID group 21A. The LU 41B (VOLUME#B) allocated to the guest OS 11B belongs to the RAID group 21A. The startup status of the guest OS 11A to which the LU 41A (VOLUME#A) is allocated is the [IN-STOP STATUS], and the startup status of the guest OS 11B to which the LU 41B (VOLUME#B) is allocated is the [IN-STOP STATUS]. Namely, the startup statuses of both of the guest OS 11A and the guest OS 11B of the host server 2A of which the access target devices are the physical disks 20A and 20B of the RAID group 21A, are the [IN-STOP STATUS]. It is therefore feasible to stop the rotations of the physical disks 20A and 20B, and the rotation stop instruction of the physical disks 20A and 20B is transmitted to the storage device 5. The storage device 5 receiving the rotation stop instruction of the physical disks 20A and 20B stops rotating the physical disks 20A and 20B.

Figure 17:
FIG. 17 is a diagram of the storage table 80 in a status where the data in the "DISK ROTATING STATUS" field is updated.

Then, the updating unit 63 updates the data in the "DISK ROTATING STATUS" field of the storage table 80 (S1509). FIG. 17 is a diagram of the storage table 80 in the status where the data in the "DISK ROTATING STATUS" field of the storage table 80 is updated. The data is updated to the [IN-STOP STATUS] from the [ACCESSIBLE STATUS] in the "disk rotating status" field in the line numbers 1 and 2 of the storage table 80 illustrated in FIG. 17. After executing the process of S1509, the process of the management server 1 in the stop of the guest OS 11A is finished.

<Description of Process of Management Server 1 in Backup Process of Backup Server 3>

Figure 18:
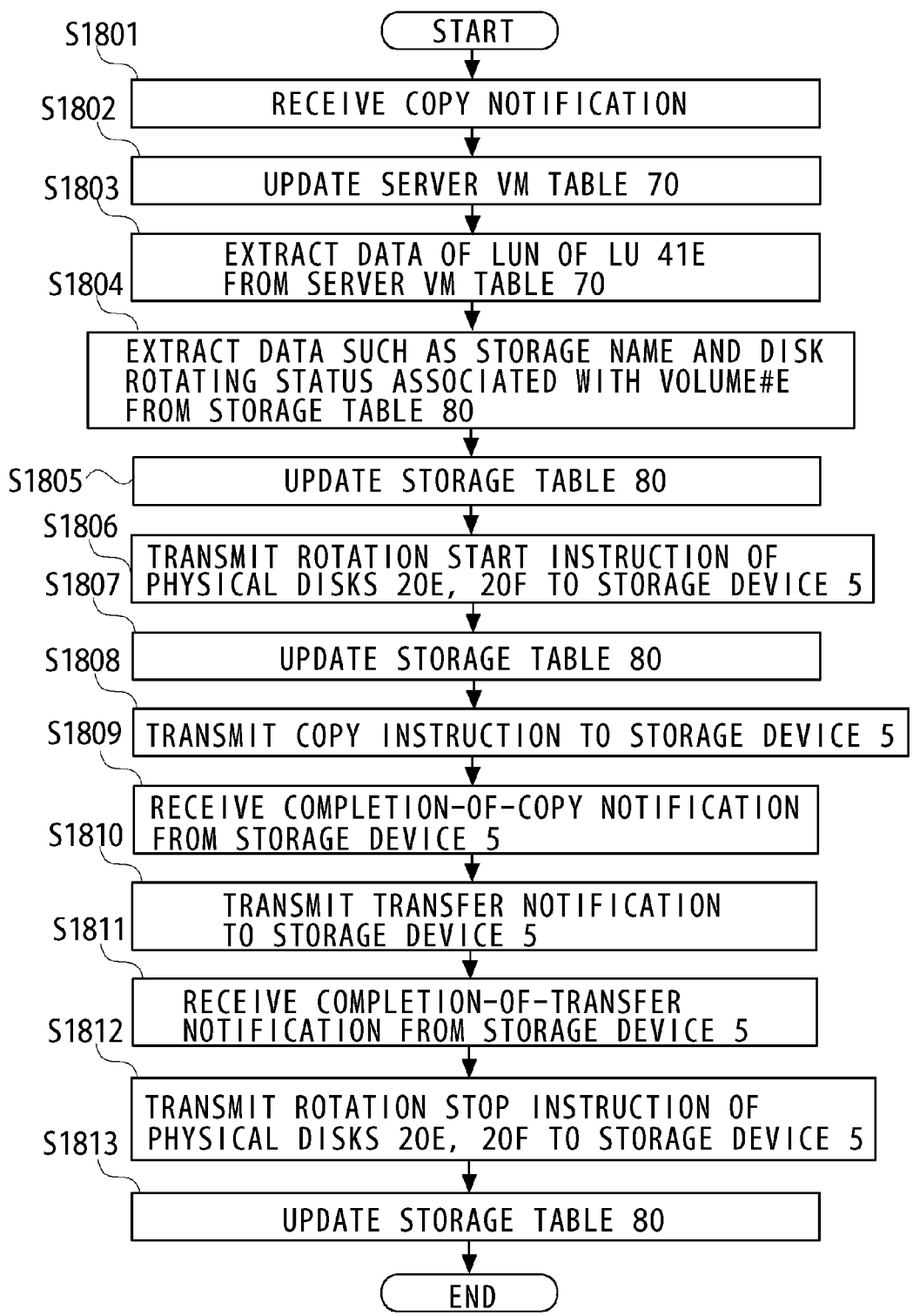
FIG. 18 is a flowchart illustrating a processing flow of a process of the management server 1 in a case where a backup server 3 executes a backup process.

A process of the management server 1 in such a case that the backup server 3 executes a backup process, will be described with reference to FIG. 18. FIG. 18 is a flowchart illustrating a processing flow of the management server 1 in the case where the backup server 3 executes the backup process. Herein, the guest OSs 11A-11D and the backup server 3 are in the in-stop status. Accordingly, the contents of the server VM table 70 held by the management server 1 are those illustrated in FIG. 4. Moreover, the contents of the storage table 80 held by the management server 1 are those illustrated in FIG. 5.

The backup server 3 accepts a backup instruction from the user. The backup instruction shall be an instruction of copying the data recorded in the LU 41A to the LU 41E. The backup server 3 accepting the backup instruction transmits, to the management server 1, a notification saying that the data recorded in the LU 41A is copied to the LU 41E.

The interface unit 59 receives from the backup server 3 the notification saying that the data recorded in the LU 41A is copied to the LU 41E (S1801). When the interface unit 59 receives the notification saying that the data recorded in the LU 41A is copied to the LU 41E, the updating unit 63 updates the data in the "SERVER OPERATING STATUS" field of the server VM table 70 (S1802). FIG. 19 is a diagram of the server VM table 70 in a status where the data in the "server operating status" field is updated. The data is updated to the [IN-OPERATION STATUS] from the [IN-STOP STATUS] in the "SERVER OPERATING STATUS" field in the line number 5 of the server VM table 70 illustrated in FIG. 19.

Then, the extracting unit 62 extracts the data of the LUN of the LU 41E as the access target area of the backup server 3 from the server VM table 70 (S1803). Herein, the data [VOLUME#E] defined as the LUN of the LU 41E as the access target area of the backup server 3 is extracted from the server VM table 70 illustrated in FIG. 19.

Next, the extracting unit 62 extracts, from the storage table 80, the respective items of data such as the storage name and the disk rotating status associated with the data [VOLUME#E] extracted in the process of S1803 (S1804). Namely, the extracting unit 62 extracts, based on the data [VOLUME#E] extracted in the process of S1803, the respective items of data such as the storage name and the disk rotating status in the items of the data related to the RAID group 21A including the physical disks 20E and 20F in which the LU 41E is set from the storage table 80. Herein, the data [DISK-C] is extracted as the data of the storage name from the storage table 80 illustrated in FIG. 5. Further, the data [in-stop status] is extracted as the data of the disk rotating status from the storage table 80 depicted in FIG. 5.

Figure 20:
FIG. 20 is a diagram of the storage table 80 in a status where the data in the "DISK ROTATING STATUS" field is updated.

Then, the updating unit 63 updates the data in the "DISK ROTATING STATUS" field of the storage table 80 (S1805). FIG. 20 is a diagram of the storage table 80 in a status where the data in the "disk rotating status" field is updated. The data is updated from the [IN-STOP STATUS] to a [ROTATION STARTING STATUS] in the "DISK ROTATING STATUS" field in the line number 5 of the storage table 80 illustrated in FIG. 20.

Next, the instructing unit 64 sends an instruction of starting the rotations of the physical disks 20E and 20F to the storage device 5 via the interface unit 59 (S1806).

Herein, the storage device 5 receiving the rotation starting instruction of the physical disks 20E and 20F starts rotating the physical disks 20E and 20F. Then, when the rotations of the physical disks 20E and 20F reach the accessible status, the storage device 5 sends to the management server 1 a notification saying that the physical disks 20E and 20F become accessible.

In the case of receiving the notification saying that the physical disks 20E and 20F become accessible, the updating unit 63 updates the data in the "DISK ROTATING STATUS" field of the storage table 80 (S1807). FIG. 21 is a diagram of the storage table 80 in a status where the data in the "DISK ROTATING STATUS" field is updated. The data is updated from the [ROTATION STARTING STATUS] to an [ACCESSIBLE STATUS] in the "DISK ROTATING STATUS" field in the line number 5 of the storage table 80 illustrated in FIG. 21.

Next, the extracting unit 62 extracts, from the storage table 80, the data of the rotating statuses of the physical disks 20A and 20B in which the LU 41A is set. Namely, based on [VOLUME#A] as the LUN of the LU 41A recorded with original data of the copy, the data of the disk rotating status of [DISK-A] is extracted from the storage table 80. Herein, the data [IN-STOP STATUS] is extracted as the data of the disk rotating status from the storage table 80 illustrated in FIG. 21.

If the rotating statuses of the physical disks 20A and 20B are the in-stop status, the processes in S605-S607 in FIG. 6 are executed. Namely, the physical disks 20A and 20B are set in the accessible status. On the other hand, if the rotating statuses of the physical disks 20A and 20B are the accessible status, the processes in S605-S607 in FIG. 6 are not executed.

Herein, the rotating statuses of the physical disks 20A and 20B are the in-stop status, and hence the processes in S605-S607 in FIG. 6 are executed.

After executing the processes in S605-S607 in FIG. 6, the instructing unit 64 transmits an instruction of copying the data recorded in the LU 41A to the LU 41E to the storage device 5 via the interface unit 59 (S1808).

The storage device 5, which receives the instruction of copying the data recorded in the LU 41A to the LU 41E, copies the date recorded in the LU 41A to the LU 41E. Then, when the data recorded in the LU 41A is copied to the LU 41E, the storage device 5 sends a completion-of-copy notification to the management server 1.

The interface unit 59 receives the completion-of-copy notification from the storage device 5 (S1809). When the interface unit 59 receives the completion-of-copy notification from the storage device 5, the extracting unit 62 extracts the data of the server operating status of the host server 2A from the server VM table 70. Herein, [IN-STOP STATUS] is extracted as the data of the server operating status from the server VM table 70 illustrated in FIG. 19. Accordingly, the operating status of the host server 2A is the in-stop status. The copy of the data recorded in the LU 41A to the LU 41E is completed. The instructing unit 64 determines, by checking the operating status of the host server 2A of which the access target area is the LU 41A, whether the rotations of the physical disks 20A and 20B, in which the LU 41 is set, can be stopped or not.

If the operating status of the host server 2A is the in-stop status, the processes in S1507 and S1508 in FIG. 15 are executed. While on the other hand, if the operating status of the host server 2A is the in-operation status, the processes in S1507 and S1508 in FIG. 15 are not executed. Herein, the operating status of the host server 2A is the in-stop status, and therefore the processes in S1507 and S1508 in FIG. 15 are executed.

Next, the instructing unit 64 transmits, to the backup server 3, an instruction of transferring the data copied to the LU 41E to the tape device 4 via the interface unit 59 (S1810). The backup server 3, which receives the instruction of transferring the data copied to the LU 41E to the tape device 4, transfers the data copied to the LU 41E to the tape device 4. Then, when the transfer of the data copied to the LU 41E to the tape device 4 is completed, the storage device 5 transmits a completion-of-transfer notification to the management server 1.

The interface unit 59 receives the completion-of-transfer notification from the storage device 5 (S1811). When the interface unit 59 receives the completion-of-transfer notification from the storage device 5, the instructing unit 64 transmits an instruction of stopping the rotations of the physical disks 20E and 20F to the storage device 5 via the interface unit 59 (S1812). The storage device 5 receiving the instruction of stopping the rotations of the physical disks 20E and 20F stops rotating the physical disks 20E and 20F.

Then, the updating unit 63 updates the data in the "DISK ROTATING STATUS" field of the storage table 80 (S1813). FIG. 22 is a diagram of the storage table 80 in a status where the data in the "DISK ROTATING STATUS" field is updated. The data is updated from the [ACCESSIBLE STATUS] to the [IN-STOP STATUS] in the "DISK ROTATING STATUS" field in the line number 5 of the storage table 80 illustrated in FIG. 22. After executing the process in S1813, the process of the management server 1 in such a case that the backup server 3 executes the backup process, is finished.

<Description of Extension of Physical Disk>

Figure 23:
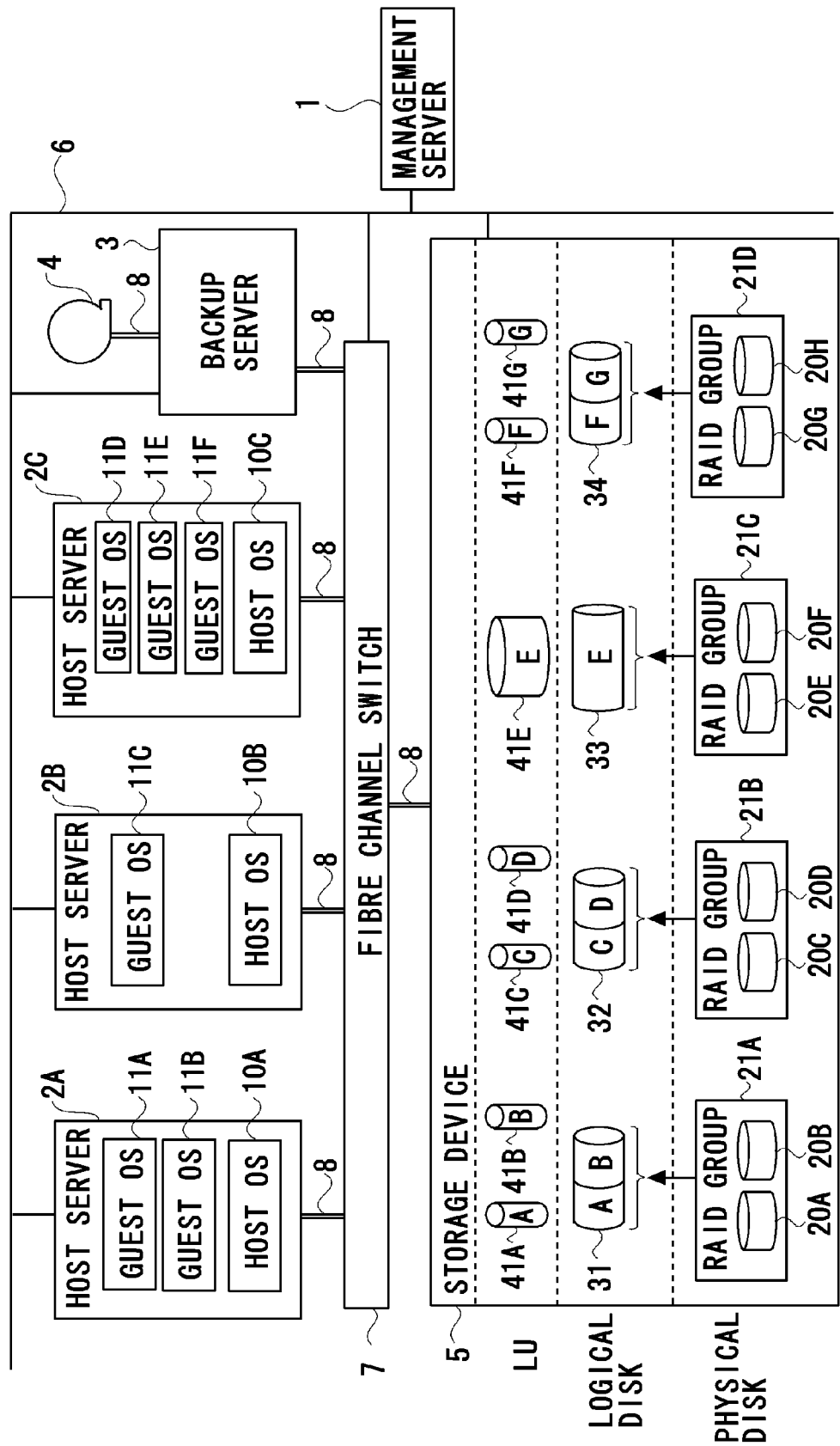
FIG. 23 is a diagram of the whole system in the case of extending physical disks 20G and 20H in the storage device 5.

A process of the management server 1 in the case of extending the physical disks 20G and 20H in the storage device 5, will be described. FIG. 23 is a diagram of the whole system in the case of extending the physical disks 20G and 20H in the storage device 5. The storage device 5 has extensions of the physical disks 20G and 20H. Further, the guest OSs 11E and 11F are added to the host server 2C.

The storage device 5 is provided with the RAID group 21D including the physical disks 20G and 20H as one aggregation. The storage device 5 includes a logical disk 34. One logical disk 34 is configured by connecting the physical disks 20G and 20H together. The storage device 5 includes the LU 41F and the LU 41G. The LU 41F and the LU 41G are a plurality of storage areas into which the logical disk 34 is segmented. The LU 41F and the LU 41G are set on the physical disks 20G and 20H. The LU 41F and the LU 41G are called also logical volumes.

Figure 24:
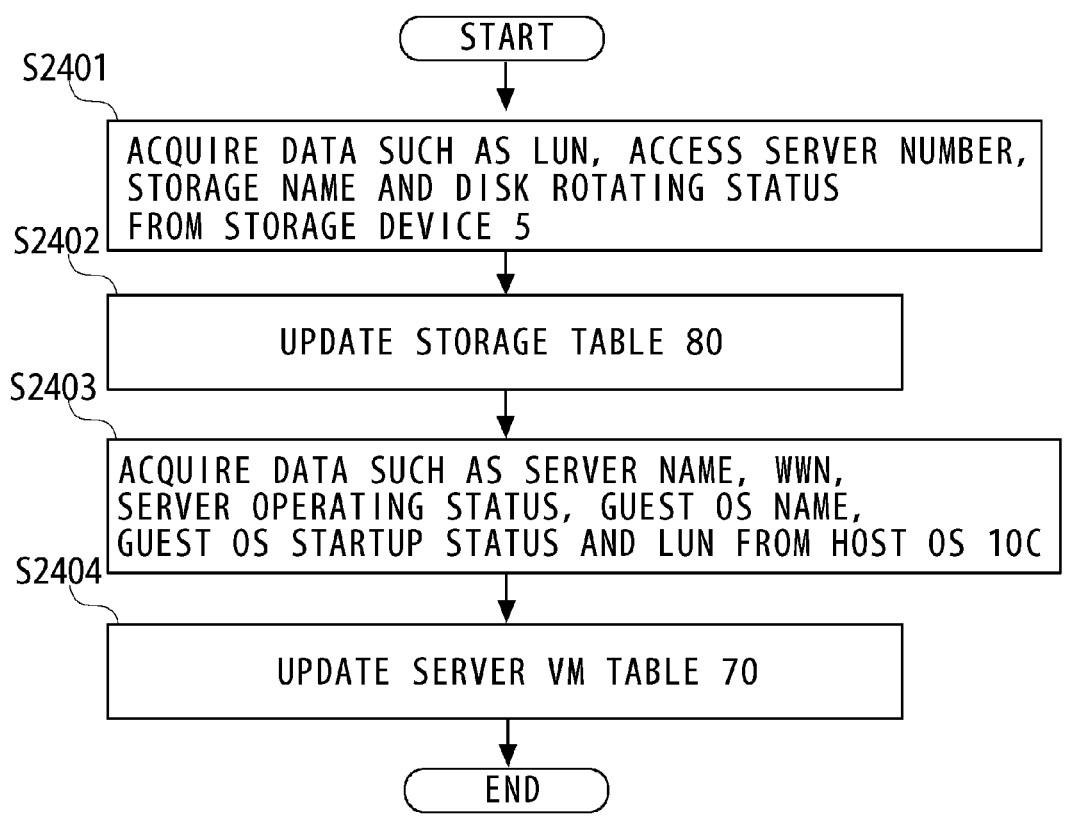
FIG. 24 is a flowchart illustrating a process of the management server 1 in the case of extending the physical disks 20G and 20H in the storage device 5.

FIG. 24 is a flowchart illustrating a processing flow of the management server 1 in the case of extending the physical disks 20G and 20H in the storage device 5. Herein, the guest OSs 11A-11D are in the in-stop status. Further, the backup server 3 is in the in-stop status. Accordingly, the contents of the server VM table 70 held by the management server 1 are those illustrated in FIG. 4. Moreover, the contents of the storage table 80 held by the management server 1 are those illustrated in FIG. 5.

The host server 2C sets the LU 41F and the LU 41G as the access target areas. Furthermore, the host OS 10C allocates the LU 41F to the guest OS 11F and allocates the LU 41G to the guest OS 11G. The host server 2C notifies the storage device 5 that the LU 41F and the LU 41G are set as the access target areas. The storage device 5 permits the host server 2C to set the LU 41F and the LU 41G as the access target areas.

The acquiring unit 60 acquires the respective items of data such as the LUN, the access server number, the storage name and the disk rotating status from the storage device 5 (S2401). The respective items of data may also be acquired in such a manner that the acquiring unit 60 periodically accesses the storage device 5 via the interface unit 59. Moreover, the storage device 5 may transmit the respective items of data to the management server 1 periodically or when satisfying a predetermined condition. The respective items of data transmitted to the management server 1 are acquired by the acquiring unit 60 via the interface unit 59.

In the case of acquiring the respective items of data such as the server name, the WWN, the server operating status, the guest OS name, the guest OS startup status and the LUN from the storage device 5, the updating unit 63 updates the storage table 80 (S2402). FIG. 25 is a diagram of the post-updating storage table 80. The items of data about the physical disks 20G and 20H are added to the storage table 80 illustrated in FIG. 25. To be specific, the data [VOLUME#F] is added to the "LUN" field in the line number 6 and the data [VOLUME#G] is added to the "LUN" field in the line number 7 of the storage table 80 illustrated in FIG. 25. The data [WWN#3] and [WWN#3] are respectively added to the "ACCESS SERVER NUMBER" field in the line numbers 6 and 7 of the storage table 80 illustrated in FIG. 25. The data [DISK-D] and [DISK-D] are respectively added to the "STORAGE NAME" field in the line numbers 6 and 7 of the storage table 80 illustrated in FIG. 25. The data [IN-STOP STATUS] and [IN-STOP STATUS] are respectively added to the "DISK ROTATING STATUS" field in the line numbers 6 and 7 of the storage table 80 illustrated in FIG. 25.

Then, the acquiring unit 60 acquires the respective items of data such as the server name, the WWN, the server operating status, the guest OS name, the guest OS startup status and the LUN from the host OS 10C (S2403). The respective items of data may also be acquired in such a way that the acquiring unit 60 periodically accesses the host server 2C via the interface unit 59. Moreover, the host server 2C may transmit the respective items of data to the management server 1 periodically or when satisfying a predetermined condition. The respective items of data transmitted to the management server 1 are acquired by the acquiring unit 60 via the interface unit 59.

In the case of acquiring the respective items of data such as the server name, the WWN, the server operating status, the guest OS name, the guest OS startup status and the LUN from the host OS 10C, the updating unit 63 updates the server VM table 70 (S2404).

Figure 26:
FIG. 26 is a diagram of the post-updating server VM table 70.

FIG. 26 is a diagram of the post-updating server VM table 70. The items of data about the guest OSs 11E and 11F are added to the server VM table 70 illustrated in FIG. 26. To be specific, the data [VM-E] is added to the "GUEST OS NAME" field in the line number 5 and [VM-F] is added thereto in the line number 6 of the server VM table 70 illustrated in FIG. 26. The data [VM-E] is a name of the guest OS 11E, and [VM-F] is a name of the guest OS 11F. The data [IN-STOP STATUS] and [IN-STOP STATUS] are respectively added to the "GUEST OS STARTUP STATUS" field in the line numbers 5 and 6 of the server VM table 70 illustrated in FIG. 26. The data [VOLUME#F] is added to the "LUN" field in the line number 5 and the data [VOLUME#G] is added to the "LUN" field in the line number 6 of the server VM table 70 illustrated in FIG. 26. The data [VOLUME#F] is the LUN of the LU 41F allocated to the guest OS 11E. The data [VOLUME#G] is the LUN of the LU 41G allocated to the guest OS 11F.

After executing the process in S2404, the process of the management server 1 in the case of extending the physical disks 20G and 20H in the storage device 5, is finished. The process of the management server 1 in the case of starting up the guest OS 11E or 11F is carried out by use of the server VM table 70 illustrated in FIG. 26 and the storage table 80 illustrated in FIG. 25. The specific process of the management server 1 in the case of starting up the guest OS 11E or 11F is the same as the process of the management server 1 in the case of starting up the guest OS 11A.

<Description of Migration of Guest OS>

Figure 27:
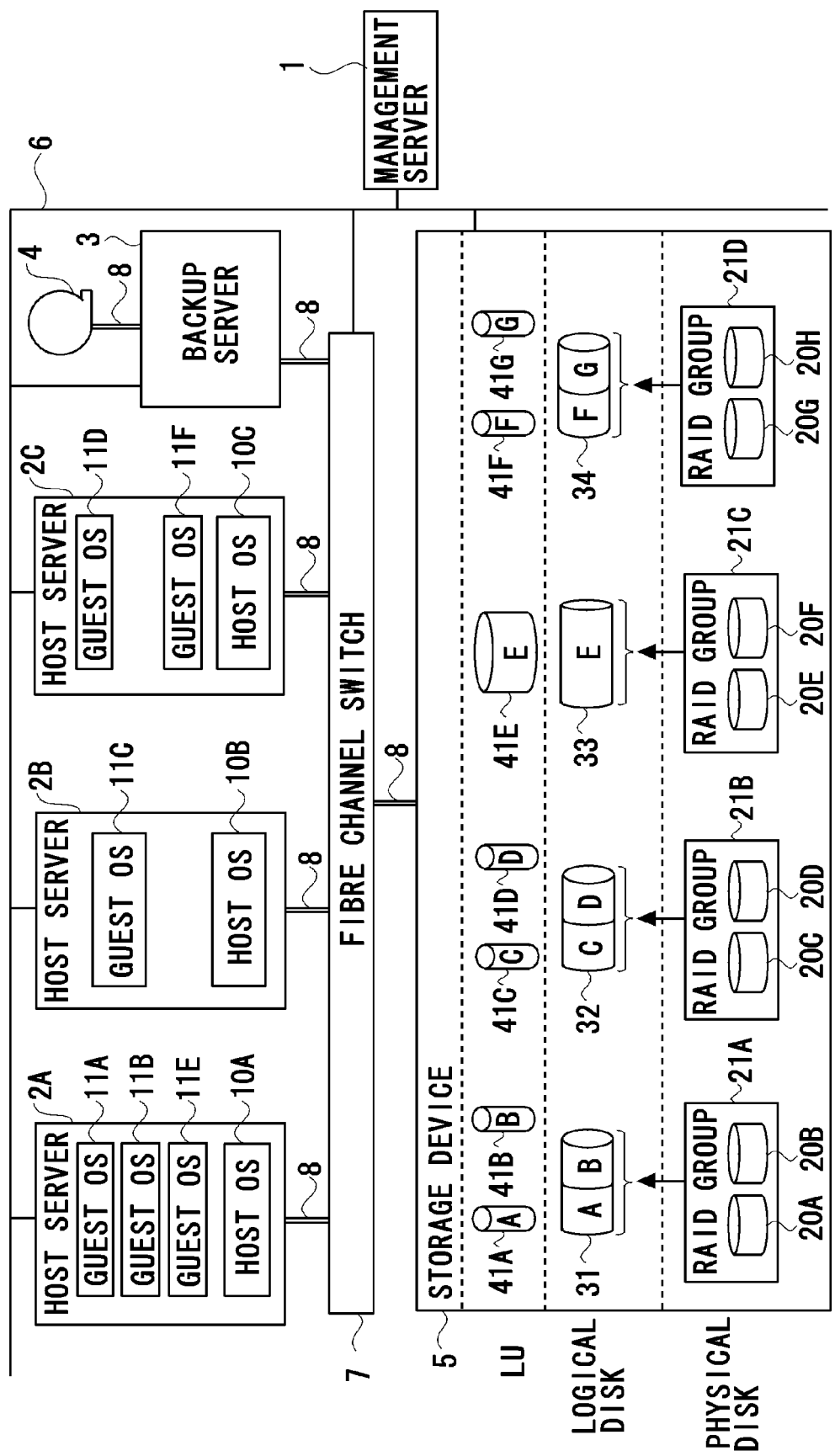
FIG. 27 is a diagram of the whole system in a case where a guest OS 11E of a host server 2C migrates to a host server 2A.

A process of the management server 1 in the case of performing migration of the guest OS 11E of the host server 2C into the host server 2A, will be explained. FIG. 27 is a diagram of the whole system in the case of performing the migration of the guest OS 11E of the host server 2C into the host server 2A. As illustrated in FIG. 27, the guest OS 11E migrates from the host server 2C to the host server 2A.

Figure 28:
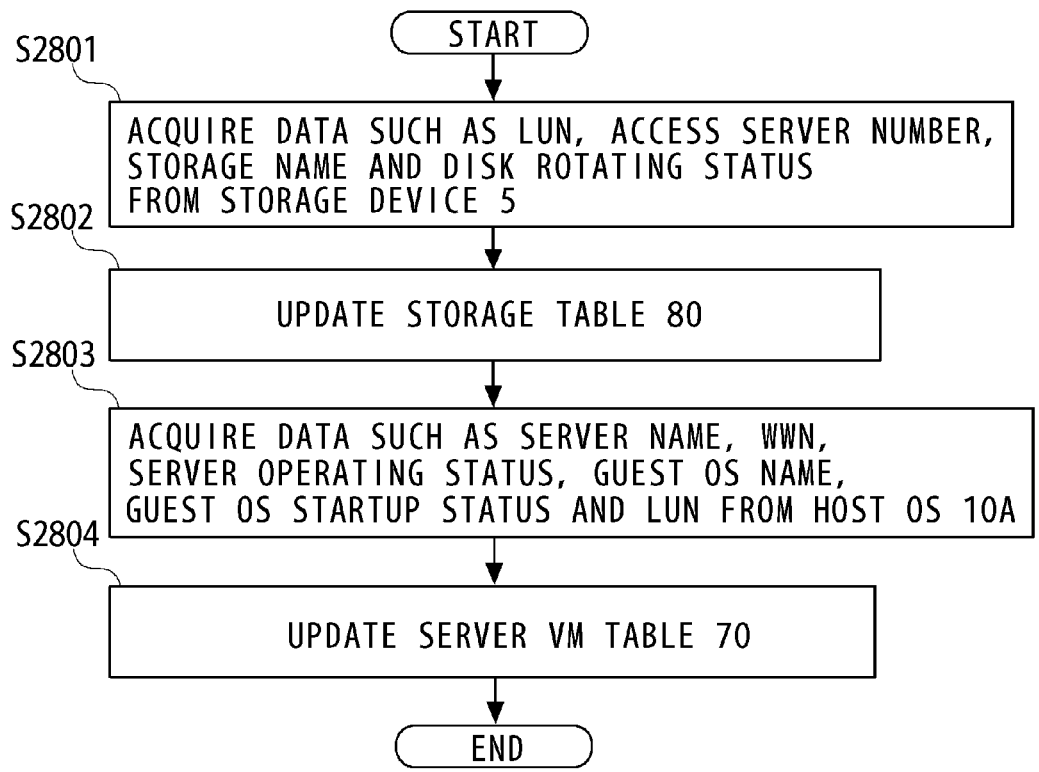
FIG. 28 is a flowchart illustrating a processing flow of the management server 1 in the case where the guest OS 11E of a host server 2C migrates to a host server 2A.

FIG. 28 is a flowchart illustrating of a processing flow of the management server 1 in the case of performing the migration of the guest OS 11E of the host server 2C into the host server 2A. Herein, the guest OSs 11A-11F are in the in-stop status. Further, the backup server 3 is in the in-stop status. Accordingly, the contents of the server VM table 70 held by the management server 1 are those illustrated in FIG. 26. Moreover, the contents of the storage table 80 held by the management server 1 are those illustrated in FIG. 25.

Herein, the guest OS 11E migrates to the host server 2A from the host server 2C, whereby the host server 2A sets the LU 41A, LU 41B and LU 41F as the access target areas. The host OS 10A allocates the LU 41F to the guest OS 11E. The host server 2A notifies the storage device 5 that the LU 41F is set as the access target area. The storage device 5 permits the host server 2C to set the LU 41F as the access target area.

The acquiring unit 60 acquires the respective items of data such as the LUN, the access server name, the storage name and the disk operating status from storage device 5 (S2801).

The respective items of data may also be acquired in such a manner that the acquiring unit 60 periodically accesses the storage device 5 via the interface unit 59. Moreover, the storage device 5 may transmit the respective items of data to the management server 1 periodically or when satisfying a predetermined condition. The respective items of data transmitted to the management server 1 are acquired by the acquiring unit 60 via the interface unit 59.

Figure 29:
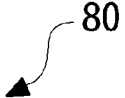
FIG. 29 is a diagram of the post-updating storage table 80.

In the case of acquiring the respective items of data such as the server name, the WWN, the server operating status, the guest OS name, the guest OS startup status and the LUN from the storage device 5, the updating unit 63 updates the storage table 80 (S2802). FIG. 29 is a diagram of the post-updating storage table 80. The items of data about the host server 2A are updated in the storage table 80 illustrated in FIG. 29. To be specific, the data is updated from [WWN#] to [WWN#1] in the "ACCESS SERVER NAME" field in the line number 6 of the storage table 80 illustrated in FIG. 29.

Then, the acquiring unit 60 acquires the respective items of data such as the server name, the WWN, the server operating status, the guest OS name, the guest OS startup status and the LUN from the host OS 10A (S2803). The respective items of data may also be acquired in such a way that the acquiring unit 60 periodically accesses the host server 2A via the interface unit 59. Moreover, the host server 2A may transmit the respective items of data to the management server 1 periodically or when satisfying a predetermined condition. The respective items of data transmitted to the management server 1 are acquired by the acquiring unit 60 via the interface unit 59.

In the case of acquiring the respective items of data such as the server name, the WWN, the server operating status, the guest OS name, the guest OS startup status and the LUN from the host OS 10A, the updating unit 63 updates the server VM table 70 (S2804). FIG. 30 is a diagram of the post-updating server VM table 70. In the server VM table 70 illustrated in FIG. 30, the data related to the guest OS 11E is updated. As illustrated in FIG. 30, the data [VM-E], the data [IN-STOP STATUS] and the data [VOLUME#F] with respect to the guest OS 11E are changed from the group of the host server 2C to the group of the host server 2A.

After executing the process in S2804, the process of the management server 1 in the case of performing the migration of the guest OS 11E of the host server 2C to the host server 2A, is finished. The process of the management server 1 in the case of starting up the guest OS 11E is conducted by use of the server VM table 70 illustrated in FIG. 30 and the storage table 80 illustrated in FIG. 29. The specific process of the management server 1 in the case of starting up the guest OS 11E is the same as the process of the management server 1 in the case of starting up the guest OS 11A.

In the embodiment, the management server 1 acquires the various items of data from the host servers 2A-2C and the backup server 3 and further acquires the various items of data from the storage device 5. According to the embodiment, the management server 1 manages the host servers 2A-2C, the backup server 3 and the storage device 5, thereby enabling a grasp of the timing when the rotations of the physical disks 20A-20H can be stopped. Then, the rotations of the physical disks 20A-20H provided in the storage device 5 can be stopped at the further proper timing. As a result, the power save efficiency of the storage device 5 can be increased.

<Modified Example>

As discussed above, there has been made the description of the example in which the storage device 5 includes the physical disks 20A and 20B and is provided with the RAID group 21A including the physical disks 20A and 20B as one aggregation. The embodiment is not limited to this example, but the storage device 5 may not be provided with the RAID group 21A. Namely, the physical disks 20A and 20B are not connected. In this case, the physical disk 20A may be configured as one logical disk 31, and the LU 41A and LU 41B may be set on the physical disk 20A by segmenting the logical disk 31. Moreover, the physical disk 20B may also be configured as one logical disk 31, and the LU 41A and LU 41B may be set on the physical disk 20B by segmenting the logical disk 31.

Further, the storage device 5 may not be provided with the RAID group 21B. Namely, the physical disks 20C and 20D are not connected. In this case, the physical disk 20C may be configured as one logical disk 32, and the LU 41C and LU 41D may be set on the physical disk 20D by segmenting the logical disk 32.

Moreover, the storage device 5 may not be provided with the RAID group 21C. Namely, the physical disks 20E and 20F are not connected. In this case, the physical disk 20E may be configured as one logical disk 33, and the LU 41E may be set on the physical disk 20E. Further, the physical disk 20F may be configured as one logical disk 33, and the LU 41E may be set on the physical disk 20F.

Furthermore, the storage device 5 may not be provided with the RAID group 21D. Namely, the physical disks 20G and 20H are not connected. In this case, the physical disk 20G may be configured as one logical disk 34, and the LU 41F and LU 41G may be set on the physical disk 20G by segmenting the logical disk 34. Moreover, the physical disk 20H may be configured as one logical disk 34, and the LU 41F and LU 41G may be set on the physical disk 20H by segmenting the logical disk 34.

Then, the storage name described above is treated as the name of each of the physical disks 20A-20H. For example, the data [DISK-A] is recorded as the name of the physical disk 20A or the physical disk 20B in the storage table 80.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A management device to manage a storage device having physical disks in which logical volumes are set and servers of which an access target is the logical volume, the management device comprising:

a first recording unit to record an identification number of the logical volume and a rotating status of the physical disk;

a second recording unit to record an operating status of the servers and the identification number of the logical volume as the access target of the servers;

an extracting unit to extract, based on the identification number of one logical volume as the access target of one server that is recorded in the first recording unit, an operating status of the one server from the second recording unit, and to extract, based on the identification number of another logical volume of the physical disk in which the one logical volume as the access target of the one server that is recorded in the first recording unit is set, an operating status of another server from the second recording unit, whereby an access target of the another server is the another logical volume; and an instructing unit to instruct the storage device to change a rotating status of the physical disk, corresponding to the operating status of the one server and the operating status of the another server.

2. The management device according to claim 1, wherein the servers include a virtual machine to start up an application of which the access target is the logical volume, the second recording unit is recorded with a startup status of the application and the identification number of the logical volume as the access target of the application, the extracting unit extracts, based on the identification number of the logical volume as the access target of the application that is recorded in the first recording unit, the startup status of the application from the second recording unit, and extracts, based on the identification number of another logical volume of the physical disk in which the logical volume as the access target of the application that is recorded in the first recording unit is set, a startup status of another application from the second recording unit, whereby an access target of the another application is the another logical volume, and the instructing unit instructs the storage device to change the rotating status of the Physical disk, corresponding to the startup status of the application and the startup status of the another application.

3. The management device according to claim 1, the management device further comprising:

an updating unit, when a physical disk is added to the storage device, to add the identification number of the logical volume set in the added physical disk and the rotating status of the added physical disk to the first recording unit, and to add the identification number of the logical volume set in the added physical disk and the operating status of the server of which the access target is the logical volume set in the added physical disk to the second recording unit.

4. The management device according to claim 1, wherein the extracting unit extracts the identification number of the logical volume as the access target of the server from the second recording unit, extracts, based on the extracted identification number of the logical volume as the access target of the server, the identification number of another logical volume of the physical disk in which the logical volume as the access target of the server is set from the first recording unit, and extracts, based on the extracted identification number of the another logical volume, the operating status of the another server of which the access target is another logical volume from the second recording unit.

5. The management device according to claim 1, wherein the instructing unit, when one server and the another server stop accessing the logical volumes, instructs the storage device to stop rotations of the physical disk.

6. The management device according to claim 2, wherein the updating unit, when the application migrates between the one server and the another server, updates data recorded in the first recording unit and the second recording unit.

7. A management method for a management device that manages a storage device having physical disks in which logical volumes are set and servers of which an access target is the logical volume, the method comprising:

recording an identification number of the logical volume and a rotating status of the physical disk in a first recording unit;

recording an operating status of the servers and the identification number of the logical volume as the access target of the servers in a second recording unit;

extracting, based on the identification number of one logical volume as the access target of one server that is recorded in the first recording unit, an operating status of the one server from the second recording unit;

extracting, based on the identification number of another logical volume of the physical disk in which the one logical volume as the access target of the one server that is recorded in the first recording unit is set, an operating status of another server from the second recording unit, whereby an access target of the another server is the another logical volume; and instructing the storage device to change a rotating status of the physical disk, corresponding to the operating status of the one server and the operating status of the another server.

8. The management method according to claim 7, wherein the servers include a virtual machine to start up an application of which the access target is the logical volume, the management method further comprising:

recording a startup status of the application and the identification number of the logical volume as the access target of the application in the second recording unit, extracting, based on the identification number of the logical volume as the access target of the application that is recorded in the first recording unit, the startup status of the application from the second recording unit, extracting, based on the identification number of another logical volume of the physical disk in which the logical volume as the access target of the application that is recorded in the first recording unit is set, a startup status of another application from the second recording unit, whereby an access target of the another application is the another logical volume, instructing the storage device to change the rotating status of the physical disk, corresponding to the startup status of the application and the startup status of the another application.

9. The management method according to claim 7, the management method further comprising:

adding, when a physical disk is added to the storage device, the identification number of the logical volume set in the added physical disk and the rotating status of the physical disk to the first recording unit, and adding the identification number of the logical volume set in the added physical disk and the operating status of the server of which the access target is the logical volume set in the added physical disk to the second recording unit.

10. The management method according to claim 7, the management method further comprising:

extracting the identification number of the logical volume as the access target of the server from the second recording unit, extracting, based on the extracted identification number of the logical volume as the access target of the server, the identification number of another logical volume of the physical disk in which the logical volume as the access target of the server is set from the first recording unit, and extracting, based on the extracted identification number of another logical volume, the operating status of the another server of which the access target is another logical volume from the second recording unit.

11. The management method according to claim 7, the management method further comprising:
   instructing, when the one server and the another server stop accessing the logical volumes, the storage device to stop rotations of the physical disk.

12. The management method according to claim 8, the management method further comprising:
   updating, when the application migrates between the server and the another server, data recorded in the first recording unit and the second recording unit.

13. A computer-readable recording medium storing a management program to make a management device that manages a storage device having physical disks in which logical volumes are set and a servers of which an access target is the logical volume, execute:
   recording an identification number of the logical volume and a rotating status of the physical disk in a first recording unit;
   recording an operating status of the servers and the identification number of the logical volume as the access target of the servers in a second recording unit;
   extracting, based on the identification number of one logical volume as the access target of one server that is recorded in the first recording unit, an operating status of the one server from the second recording unit;
   extracting, based on the identification number of another logical volume of the physical disk in which the one logical volume as the access target of the one server that is recorded in the first recording unit is set, an operating status of another server from the second recording unit, whereby an access target of the another server is the another logical volume; and
   instructing the storage device to change a rotating status of the physical disk, corresponding to the operating status of the one server and the operating status of the another server.

14. The computer-readable recording medium according to claim 13, wherein the servers include a virtual machine to start up an application of which the access target is the logical volume,
   the management program makes the management device execute:
   recording a startup status of the application and the identification number of the logical volume as the access target of the application in the second recording unit,
   extracting, based on the identification number of the logical volume as the access target of the application that is recorded in the first recording unit, the startup status of the application from the second recording unit,
   extracting, based on the identification number of another logical volume of the physical disk in which the logical volume as the access target of the application that is recorded in the first recording unit is set, a startup status of another application from the second recording unit, whereby an access target of the another application is the another logical volume,
   instructing the storage device to change the rotating status of the physical disk, corresponding to the startup status of the application and the startup status of the another application.

15. The computer-readable recording medium according to claim 13, the management program makes the management device execute:
   adding, when a physical disk is added to the storage device, the identification number of the logical volume set in the added physical disk and the rotating status of the physical disk to the first recording unit, and adding the identification number of the logical volume set in the added physical disk and the operating status of the server of which the access target is the logical volume set in the added physical disk to the second recording unit.

16. The computer-readable recording medium according to claim 13, the management program makes the management device execute:
   extracting the identification number of the logical volume as the access target of the server from the second recording unit, extracting, based on the extracted identification number of the logical volume as the access target of the server, the identification number of another logical volume of the physical disk in which the logical volume as the access target of the server is set from the first recording unit, and extracting, based on the extracted identification number of another logical volume, the operating status of the another server of which the access target is another logical volume from the second recording unit.

17. The computer-readable recording medium according to claim 13, the management program makes the management device execute:
   instructing when the one server and the another server stop accessing the logical volumes, the storage device to stop rotations of the physical disk.

18. The computer-readable recording medium according to claim 14, the management program makes the management device execute:
   updating, when the application migrates between the server and the another server, data recorded in the first recording unit and the second recording unit.

* * * * *